United States Patent [19]
Mahoney et al.

[11] Patent Number: 5,659,639
[45] Date of Patent: *Aug. 19, 1997

[54] ANALYZING AN IMAGE SHOWING EDITING MARKS TO OBTAIN CATEGORY OF EDITING OPERATION

[75] Inventors: James V. Mahoney, San Francisco, Calif.; Satyajit Rao, Bangalore, India

[73] Assignee: Xerox Corporation, Stamford, Conn.

[*] Notice: The term of this patent shall not extend beyond the expiration date of Pat. No. 5,522,022.

[21] Appl. No.: 157,804

[22] Filed: Nov. 24, 1993

[51] Int. Cl.⁶ .................................................. G06T 3/00
[52] U.S. Cl. ........................ 382/309; 382/276; 395/140
[58] Field of Search ........................ 382/61, 13, 57, 382/59, 186, 187, 309–311, 295, 296, 298, 276; 358/452, 453; 364/709.12, 977.1; 345/113, 114, 179; 395/133–140, 155, 161, 146; 369/709.12

[56] References Cited

U.S. PATENT DOCUMENTS

| | | | |
|---|---|---|---|
| 4,475,239 | 10/1984 | van Raamsdonk | 382/57 |
| 4,542,378 | 9/1985 | Suganuma et al. | 340/734 |
| 5,012,521 | 4/1991 | Endo et al. | 382/59 |
| 5,123,057 | 6/1992 | Verly et al. | 382/37 |
| 5,134,669 | 7/1992 | Keogh et al. | 382/61 |
| 5,251,290 | 10/1993 | Pabon | 395/120 |
| 5,270,806 | 12/1993 | Venable et al. | 245/113 |
| 5,274,468 | 12/1993 | Ojha | 358/448 |
| 5,287,439 | 2/1994 | Koga et al. | 395/133 |
| 5,337,161 | 8/1994 | Hube | 358/448 |
| 5,345,543 | 9/1994 | Capps et al. | 395/137 |
| 5,363,211 | 11/1994 | Hasebe et al. | 358/451 |
| 5,404,439 | 4/1995 | Moran et al. | 395/155 |
| 5,438,430 | 8/1995 | Mackinlay et al. | 358/450 |
| 5,455,898 | 10/1995 | Mahoney et al. | 395/133 |
| 5,465,167 | 11/1995 | Cooper et al. | 358/468 |
| 5,490,246 | 2/1996 | Brotsky et al. | 395/161 |
| 5,513,271 | 4/1996 | Rao et al. | 392/113 |
| 5,522,022 | 5/1996 | Rao et al. | 395/140 |
| 5,537,491 | 7/1996 | Mahoney et al. | 318/218 |

OTHER PUBLICATIONS

U.S. application No. 08/039,553 entitled "Editing Text in an Image" to Bagley et al., filed Mar. 29, 1993 (to be issued on Aug. 20, 1996 as U.S. Pat. No. 5,548,700).

U.S. application No. 08/158,063 entitled "Using a Category to Analyze an Image Showing a Graphical Representation" to Mahoney et al., filed Nov. 24, 1993 (issued on Aug. 6, 1996 as U.S. Pat. No. 5,544,267–patent not available yet).

U.S. application No. 07/933,422 entitled "Automatically Changing Text Characteristics by Repositioning Word Images" to Stuart K. Card, filed Aug. 21, 1992.

(List continued on next page.)

*Primary Examiner*—Yon J. Couso
*Assistant Examiner*—Larry J. Prikockis

[57] ABSTRACT

Input image data define an input image set that shows a graphical feature and editing marks indicating an editing operation to be performed on the graphical feature. The input image data are used to obtain operation category data indicating whether the editing operation would translate the graphical feature so that it is centered at a different position within the input image set. The operation category data are used to obtain output image data defining an output image that includes an edited version of the input image set. The output image shows the graphical feature centered at a different position only if the operation category data so indicate. The input image set can include an original image showing the graphical feature and an overlay image showing the editing marks. The editing marks can form a node-link structure with the graphical feature. If the structure is a directed graph, it can indicate an editing operation that would translate the graphical feature to be centered at a different position, such as a simple translation to a new position, a translation with scaling or rotation, or a replacement operation. If the structure is an undirected graph, it can indicate an editing operation that would not translate the graphical feature, such as a delete operation or a scale or rotate operation. A rectangle with a dot inside it can indicate scaling or rotation. A cross can indicate deletion.

40 Claims, 16 Drawing Sheets

OTHER PUBLICATIONS

U.S. application No. 07/933,426 entitled "Atuomatic Image Creation by Merging Text Image and From Image" to Robertson, filed Aug. 21, 1992.

U.S. application No. 08/157,790 entitled "Using an Image Showing a Perimeter Relationship Representation to Obtain Data Indicating a Relationship Among Distinctions" (as amended) to Mahoney, filed Nov. 24, 1993.

U.S. application No. 08/543,232 entitled "Data Access Based on Human–Produced Images" to Johnson, filed Oct. 13, 1995.

U.S. application No. 08/394,919 entitled "Generalized Wiping as a User Interface for Object–Based Graphical Display" to Thomas P. Moran, filed Feb. 27, 1995.

U.S. application No. 08/503,746 entitled "Analyzing an Image Showing a Parallel Length Graph" to Rao et al., filed Jul. 18, 1995.

Fukada, Y., "Primary Algorithm for the Understanding of Logic Circuit Diagrams," *Proceedings of the 6th International Conference on Pattern Recognition, Munich West Germany*, 19–22 Oct. 1982, New York: IEEE, 1982, pp. 706–709.

Nagura, M., and Suenaga, Y., "A Facsimile–Based Graphics Editing System by Auxiliary Mark Recognition, " *IEEE Transactions on Pattern Analysis and Machine Intelligence*, IEEE, 1983, pp. 433–441.

Communication dated Oct. 5, 1995 and European Search Report, Application No. EP 94 30 8666.

Suenaga, Y., "Some Techniques for Docucment and Image Preparation," *Systems and Computers in Japan*, vol. 17, No. 3, 1986, pp. 35–46.

"A dynamic system for object description and correspondence", B. Parvin et al. Computer Vision and Pattern Recognition, 1991.

Suenaga, Y., "A Facsimile Based Text Editor Using Handwritten mark Recognition," IJCAI–79, Proceedings of the Sixth International Jount Conference on Artificial Intelligence, Tokyo, Aug. 20–23, 1979, vol. 2, pp. 856–858.

Suenaga, Y., and Nagura, M., "A Facsimile Based Manuscript Layout and Editing System by Auxiliary Mark Recognition," 5th International Conference on Pattern Recognition, vol. 2, IEEE, 1980, pp. 856–858.

Ricoh Imagio MF530 Series General Catalog, Ricoh K. K., 1992, with English translation of cover page and pp. 1–2 and 23–24.

The Apple Catalog, Fall 1993, pp. 1 and 4–5.

Helm, R. Marriott, K., Odersky, M., "Building Visual Language Parsers," in Proceedings of CHI, 1991 (New Orleans, Louisiana, Apr. 29–May 2, 1991), ACM, New York, 1991, pp. 105–112.

ANALYZING AN IMAGE SHOWING EDITING MARKS TO OBTAIN CATEGORY OF EDITING OPERATION

BACKGROUND OF THE INVENTION

The present invention relates to techniques for analyzing marks indicating an editing operation.

Suenaga, Y., "A Facsimile Based Text Editor Using Handwritten Mark Recognition," IJCAI-79, *Proceedings of the Sixth International Joint Conference on Artificial Intelligence*, Tokyo, Aug. 20–23, 1979, Vol. 2, pp. 856–858, describes a facsimile based text editor using handwritten mark recognition. As described in relation to FIG. 1, characters are placed according to ruled lines on manuscript paper. Marks are drawn directly on the manuscript paper or are drawn on other papers. Five kinds of marks are shown in FIG. 1, including a delete mark and a move mark. The move mark is defined as a line figure that consists of an arm and a loop, and a character string within the loop is extracted and inserted to the position indicated by the arm. During text editing, move marks are detected by searching along the center line of the space between lines and delete marks are detected by testing the inside of blocks. Text editing procedures and experimental results are described at pages 857–858 in relation to FIGS. 2, 3(a), and 3(b).

Suenaga, Y., and Nagura, M., "A Facsimile Based Manuscript Layout and Editing System by Auxiliary Mark Recognition," 5th *International Conference on Pattern Recognition*, Vol. 2, IEEE, 1980, pp. 856–858, describe an editor that uses handwritten mark recognition. Information for manuscript editing is input from a facsimile transmitter. Original texts, graphics, and auxiliary marks drawn on paper are input to the system as binary pictures. The marks are recognized to make a picture allocation list and a graphic command list. Handwritten alphanumerics in graphics are extracted and recognized by OCR. Fair copies of texts and graphics are constructed based on the lists and are output to a facsimile receiver. As shown and described in relation to FIG. 2, the system includes a text editing subsystem and a graphics editing subsystem.

The text editing subsystem, described at page 857, handles almost all kinds of texts having arbitrary size and format, including graphics patterns, estimating all parameters and instructions needed for editing from pictures of texts and marks. FIG. 3 shows marks, including a delete mark, a move mark, a copy mark, a pattern reservation mark, a pattern move mark, and a pattern copy mark. Marks are extracted and classified based upon topological and metric features. FIGS. 4(a) and 4(b) show an example of handwritten text editing.

The graphical editing subsystem, described at page 858, reforms line drawings using straight line or circular arc approximation and recognizes characters by OCR if marks specify to do so. FIG. 5 shows handwritten marks and seal marks. The handwritten marks include a "cutout-P" mark and a "cutout-C" mark. Marks are recognized by a procedure based on border following, to construct a mark parameters list for graphics. The picture of graphics is divided into portions—pixels surrounded by "cutout-P" marks are extracted to be stored in a binary picture file; pixels surrounded by "cutout-C" marks are extracted and sent to OCR to be recognized; and the remaining pixels are regarded as line drawings and expressed by a line drawings list (LDL). In accordance with the LDL, line drawings specified by certain marks are approximated by straight lines, circular arcs, or predetermined templates such as rectangles etc. A graphic command list is constructed and graphics are generated accordingly. An example is shown in FIGS. 6 and 1.

SUMMARY OF THE INVENTION

One aspect of the invention is based on the discovery of a technique for analyzing an image set. The image set shows a graphical feature and marks that indicate an editing operation to be performed on the graphical feature. The technique analyzes the editing marks to obtain information about the indicated editing operation.

The technique is based on the observation that editing operations on graphical features can be divided into two categories: Some operations, referred to as "move operations," are performed by translating a graphical feature so that it is centered at a different position within an image set; other operations, referred to as "in-place operations," can be performed without translating a graphical feature so that it is centered at a different position. Move operations can include simple translation, translation with scaling or rotation, and replacement, for example. In-place operations can include deletion, scaling, and rotation, for example.

The technique receives data defining an image set showing a graphical feature and editing marks indicating an editing operation to be performed on the graphical feature. The technique uses data defining the image set to obtain operation category data indicating whether the editing operation would translate the first graphical feature so that it is centered at a different position within the image set. The technique then uses the operation category data to obtain data defining a version of the image set in which the editing operation has been performed on the graphical feature. The edited version shows the graphical feature in a different position only if the operation category data indicate that the editing operation would translate the first graphical feature so that it is centered at a different position within the image set.

The editing marks can include nodes and links that form node-link structures when combined with features in an image being edited. The editing marks in each node-link structure can indicate the type of an editing operation and its parameters. The technique can be implemented by analyzing the image set to obtain constrained node-link data indicating parts of the image set that satisfy constraints on nodes, on links, and on node-link structures. The technique can use the constrained node-link data to obtain the operation category data.

The technique can apply a link type criterion to determine whether a part indicated by the constrained node-link data is a link indicating a move operation or a link indicating an in-place operation. The link type criterion can include a shape criterion requiring links indicating move operations to be shaped differently than links indicating in-place operations. For example, the shape criterion can distinguish directed links and undirected links. If the link meets a directed link criterion, it can indicate a move operation that would translate a graphical feature in the link's source node so that it is centered at a position indicated by the link's destination node. If the link meets an undirected link criterion, it can indicate an in-place operation on a graphical feature in one of its nodes.

The shape criterion can include a source end criterion and a destination end criterion. A link with ends that meet the source end and destination end criteria is a directed link that meets the shape criterion. A link that does not meet the shape criterion is an undirected link.

A part that satisfies a constraint on nodes and is near the destination end of a directed link is a destination node that indicates a destination position at which the graphical feature is to be centered after translation. If the destination node includes a connected component that encloses another graphical feature, the other graphical feature can be replaced as a part of a move operation.

If a link is directed, its destination node can include editing marks indicating a scaling parameter, a rotation parameter, or both. In the case of a move operation without scaling or rotation, the destination node can be a connected component such as a small circle indicating a new position or a larger circle that encloses a graphical feature to be replaced. In either case, the source node can include the graphical feature to be translated and editing marks that form the destination node can indicate position at which the graphical feature is to be centered after translation.

If a link is undirected, one node can include a graphical feature on which the in-place operation is to be performed and the other node can include editing marks indicating a scaling parameter, a rotation parameter, or both. In the case of a delete operation, the other node can include a distinctive mark such as an "X" or another cross mark.

For either directed or undirected links, a node that includes a rectangle with a dot inside it can indicate a scale/rotate operation, with the dimensions of the rectangle indicating the dimensions of an object after scaling and with the side of the rectangle closest to the dot indicating the position of the object's base after rotation.

To assist in obtaining data indicating a node-link structure, editing marks can be provided in a form that is readily distinguished from an image being edited. For example, the editing marks can be made on a transparent sheet overlaid on another sheet bearing the image being edited. The two sheets can then be separately scanned to obtain data defining an image set. Some operations would be performed on graphical features shown by the original image being edited, while others would be performed on graphical features shown by the overlay image.

The technique described above can be implemented with a machine that includes image input circuitry and data indicating image processing instructions. The image input circuitry can receive input image data defining an image set that shows a first graphical feature and editing marks indicating an editing operation to be performed on the first graphical feature. The machine's processor can execute the image processing instructions. In executing the image processing instructions, the processor can use the input image data to obtain operation category data indicating whether the editing operation would translate the first graphical feature so that it is centered at a different position within the image set. The processor can then use the operation category data to obtain output image data defining a version of the first image set in which the editing operation has been performed on the first graphical feature. The edited version shows the first graphical feature centered at a different position only if the operation category data indicate that the editing operation would translate the first graphical feature so that it is centered at a different position within the input image set. The machine can be a high-speed image processing server that responds to image processing requests from a network to which it is connected.

A software product implementing the invention can include a storage medium and data stored by the storage medium. The software product can be used in a machine that includes image input circuitry. The data stored by the storage medium can include image processing instructions the machine's processor can execute. In executing the image processing instructions, the processor can receive from the image input circuitry input image data defining an input image set that shows a first graphical feature and editing marks indicating an editing operation to be performed on the first graphical feature. The processor uses the input image set data to obtain operation category data and then uses the operation category data to obtain output image data defining a version of the input image set in which the editing operation has been performed on the first graphical feature.

Another aspect of the invention is based on the observation that some types of graphical representations include parts that are related such that an editing operation on one part can require editing operations on related parts. For example, in a node-link structure such as a directed graph or a circuit diagram, deletion of a node requires deletion of links for which the node is a source or destination; in a bar chart, deleting, inserting, or moving a bar requires repositioning of other bars; and, in a pie chart, deleting, inserting, or moving a segment requires adjustment of other segments.

This aspect is further based on the discovery of a technique that can extend an editing to perform additional required operations. The technique uses a category of graphical representations to determine what additional operations are required.

The technique can be implemented, for example, in a machine that includes stored data indicating, for a category of graphical representations, an additional operation that is required after a first type of editing operation. When an editing operation of the first type is performed, the machine obtains representation category data indicating the category of graphical representations and uses the representation category data and data indicating the type of editing operation to access the stored data, which can be included, for example, in data indicating instructions that are performed after a conditional branch. Then the machine uses the stored data to obtain data defining a version of an edited image in which the editing operation and the additional operation have both been performed.

The techniques described above are advantageous because they make it possible to perform graphical editing operations in response to simple editing marks made by a user. In addition, the second technique performs extended editing operations to simplify editing of a graphical representation.

The following description, the drawings, and the claims further set forth these and other aspects, objects, features, and advantages of the invention.

Figure 12:
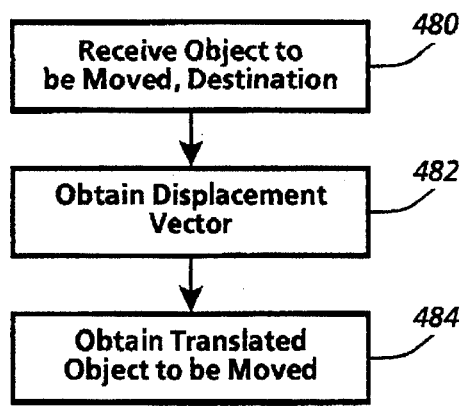
FIG. 12 is a flow chart showing acts in a translate operation in FIG. 7.
Figure 13:
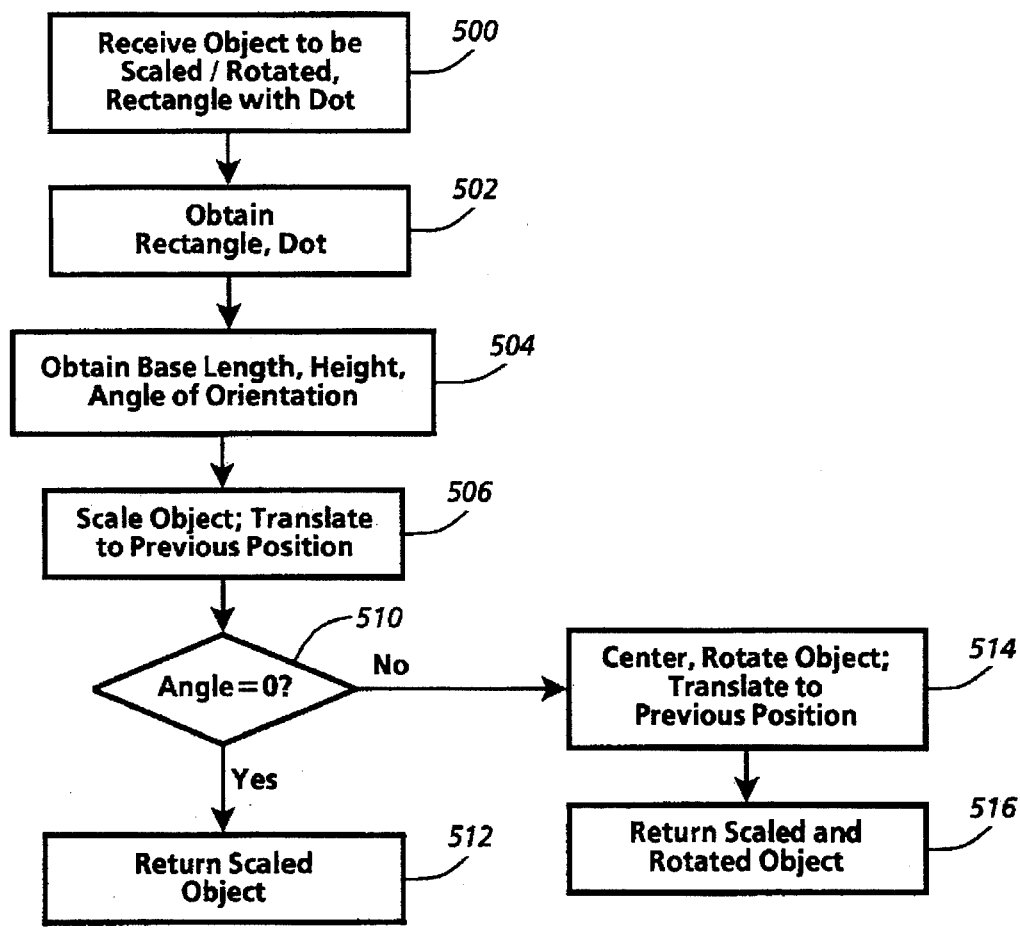
FIG. 13 is a flow chart showing acts in a scale/rotate operation in FIG. 7.
Figure 14:
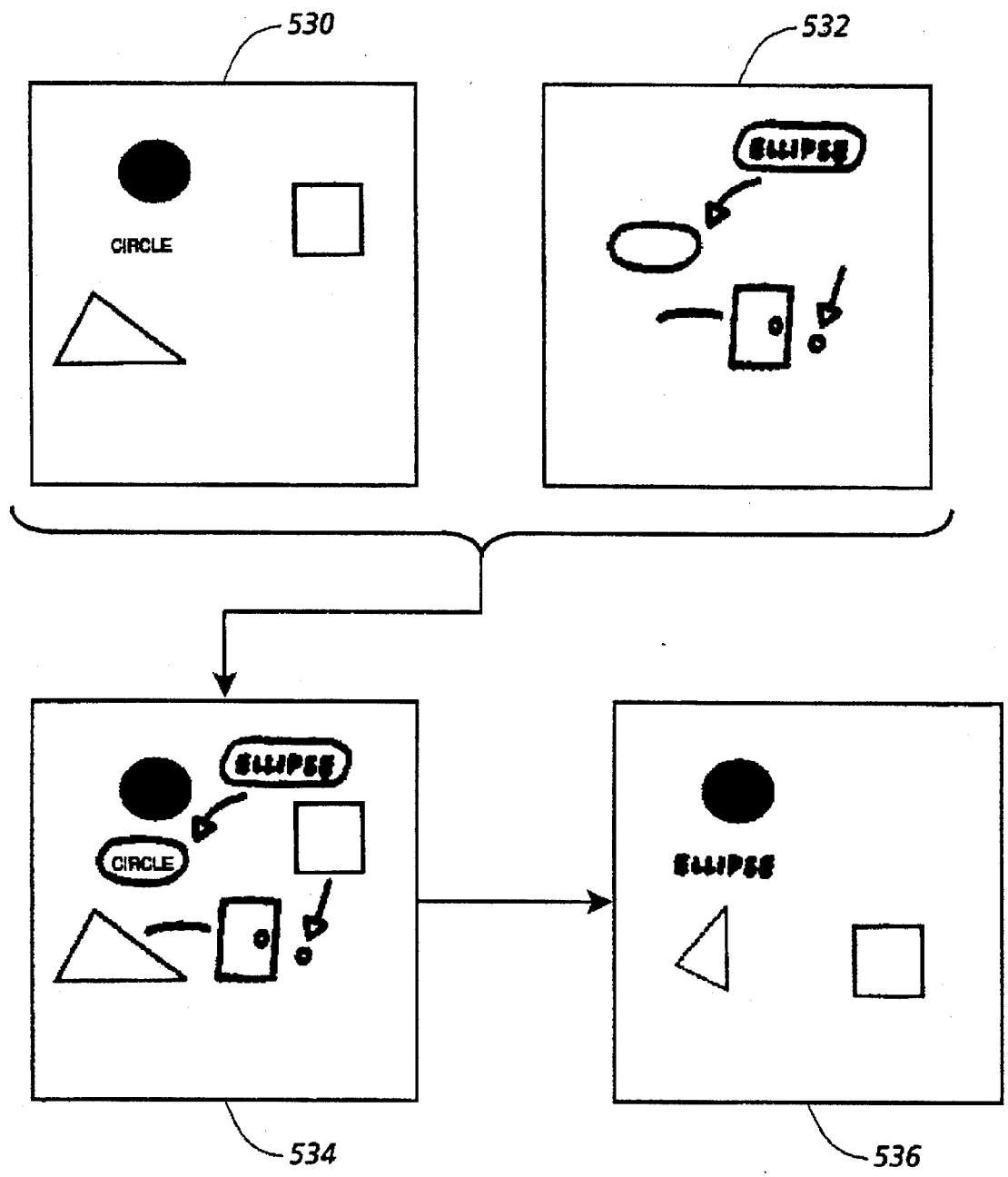
Figure 15:
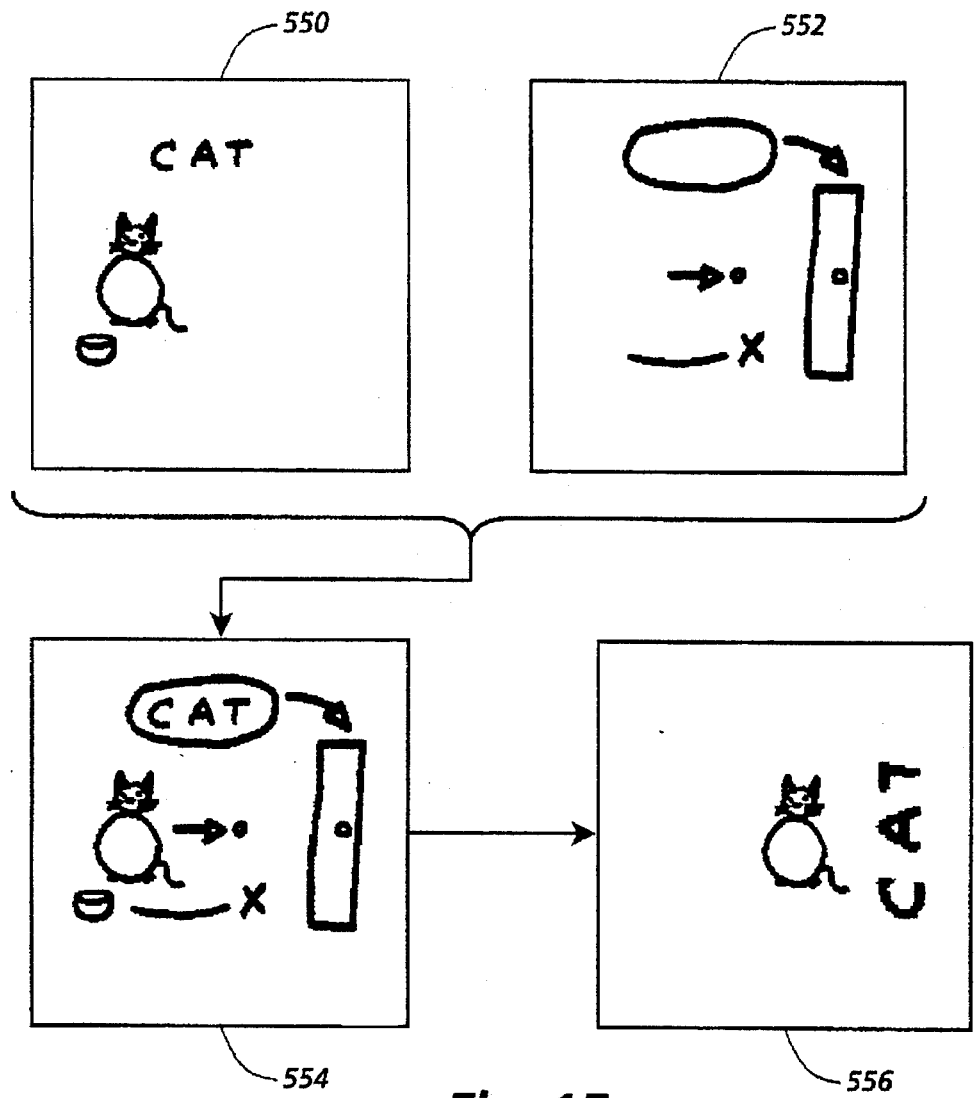
Figure 16:
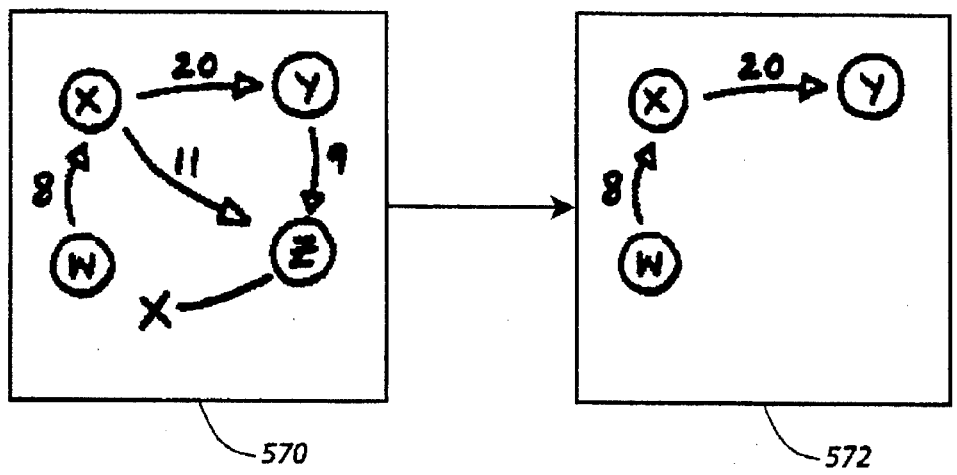

Each of FIGS. 14–16 shows an example of an input image set showing graphical features and editing marks and an output image obtained using the techniques of FIGS. 6–13.

Figure 17:
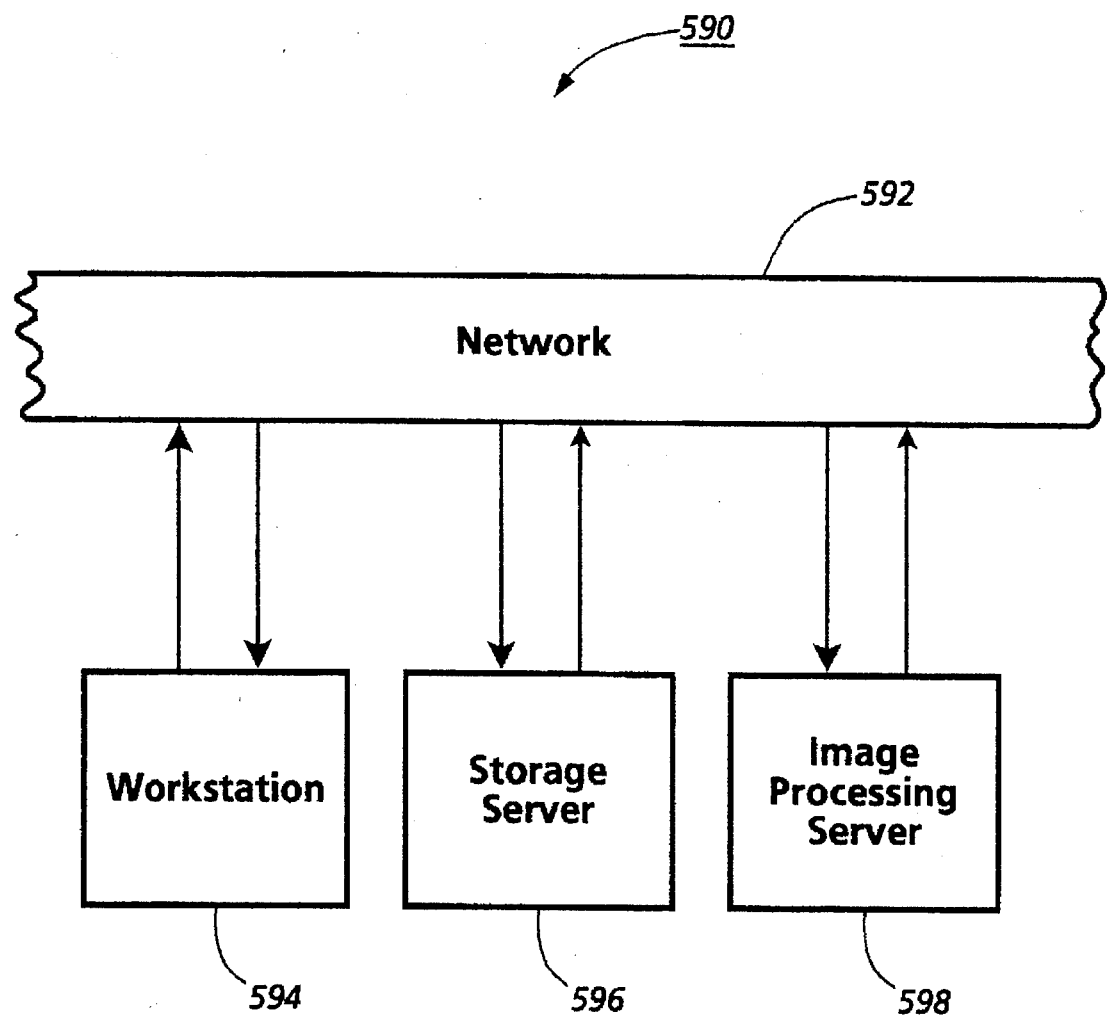

FIG. 17 is a schematic block diagram of an implementation with an image processing server.

Figure 18:
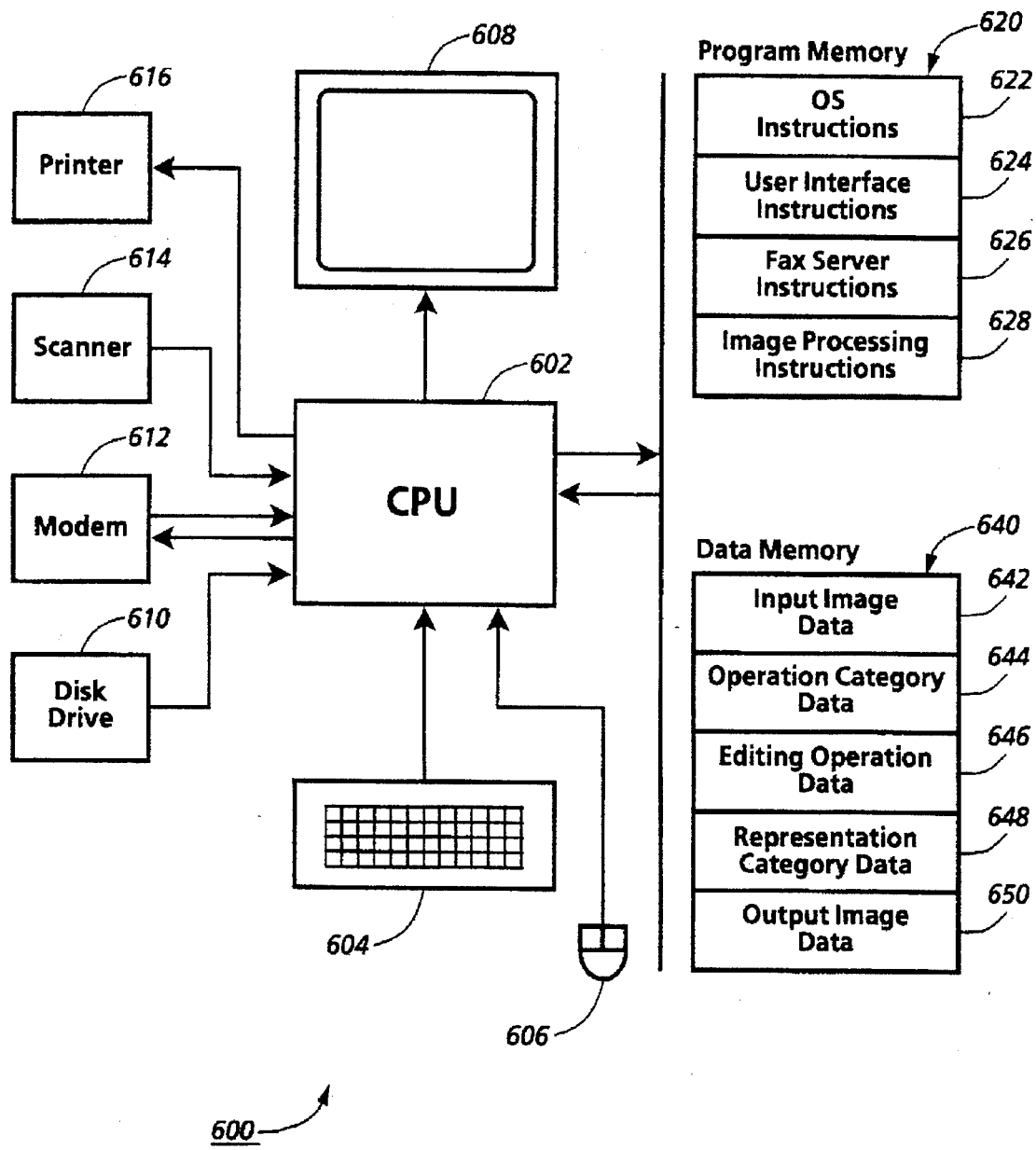

FIG. 18 is a schematic block diagram of a fax server application.

Figure 19:
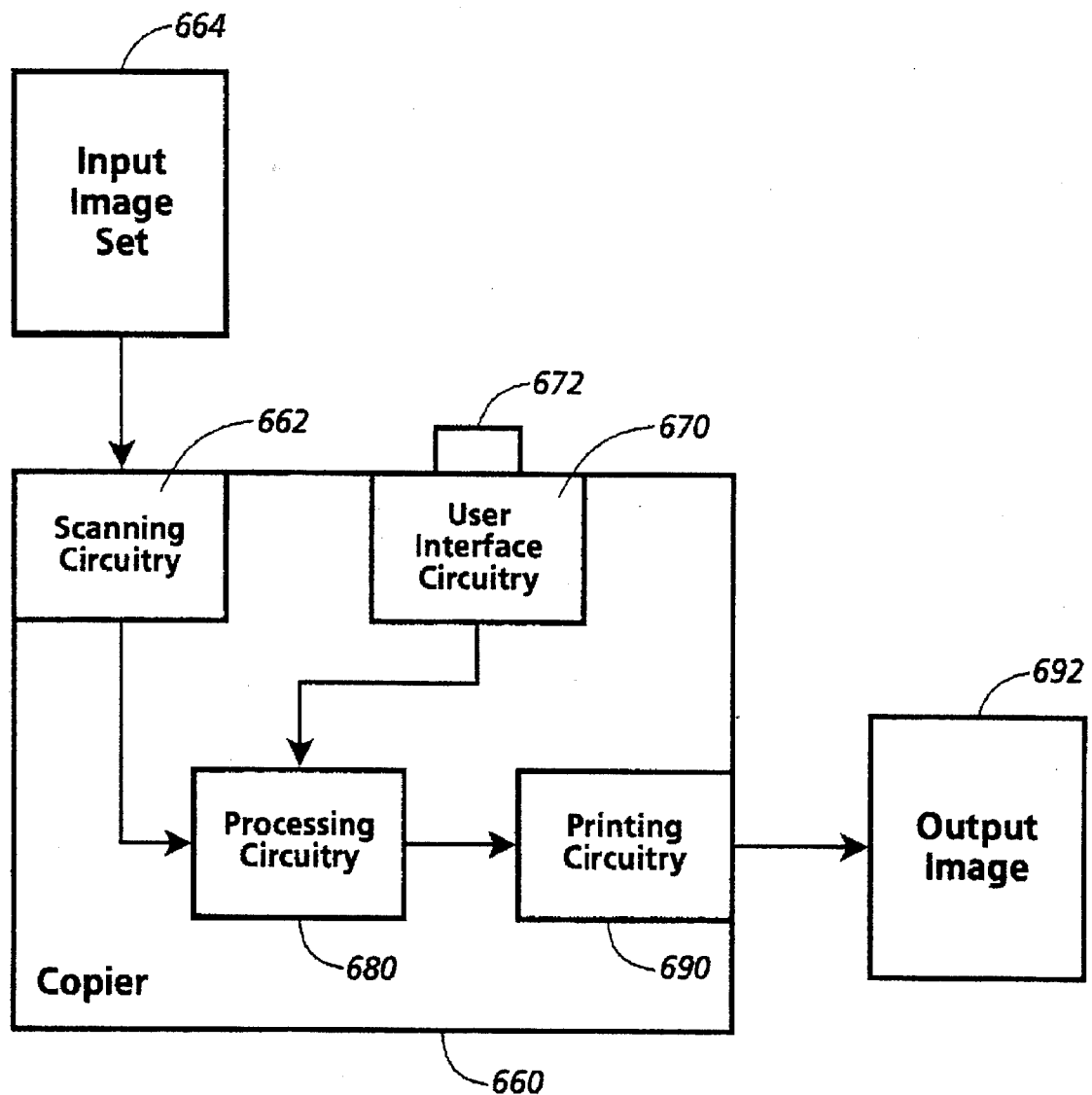

FIG. 19 is a schematic block diagram of a copier application.

DETAILED DESCRIPTION

A. Conceptual Framework

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "data processing system" is a physical system that processes data. A "data processor" or "processor" is any component or system that can process data, and may include one or more central processing units or other processing components. A processor performs an operation or a function "automatically" when it performs the operation or function independent of concurrent human control.

Any two components are "connected" when there is a combination of circuitry that can transfer signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory or input/output devices that permits the processor to access the item.

A processor or other component of circuitry "uses" an item of data in performing an operation when the result of the operation depends on the value of the item. For example, the operation could perform a logic or arithmetic operation on the item or could use the item to access another item of data.

An "instruction" is an item of data that a processor can use to determine its own operation. A processor "executes" a set of instructions when it uses the instructions to determine its operations.

A "control signal" is a signal provided to a machine or other system that can cause a change in the system's state, such as by changing the way in which the system operates. In executing a set of instructions, a processor may, for example, provide control signals to internal components within the processor and to external components connected to the processor, such as input/output devices.

A signal "requests" or "is a request for" an event or state when the signal can cause occurrence of the event or state.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

An item of data "identifies" or "is an identifier of" one of a set of identifiable items if the item of data is one of a set of items of data, each of which can be mapped to at most one of the identifiable items.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

An "image" is a pattern of physical light. An "image set" is a set of one or more images.

When an image is a pattern of physical light in the visible portion of the electromagnetic spectrum, the image can produce human perceptions. The term "graphical feature", or "feature", refers to any human perception produced by, or that could be produced by, an image.

An image "shows" a feature when the image produces, or could produce, a perception of the feature. An image set "shows" a feature when the image set includes one or more images that, separately or in combination, show the feature. An item of data "defines" a feature when the item defines an image set that shows the feature.

A "graphical representation" is a graphical feature that includes elements that are spatially related in a configuration that represents information.

An image may be divided into "segments," each of which is itself an image. A segment of an image may be of any size up to and including the whole image.

An image or image set may be analyzed into "parts," each of which is smaller than the whole image or image set. Each part includes one or more segments of the image or segments of images in the image set.

An item of data "defines" an image when the item of data includes sufficient information to produce the image. For example, a two-dimensional array can define all or any part of an image, with each item of data in the array providing a value indicating the color of a respective location of the image.

A "data image" is an item of data defining an image.

An item of data "defines" an image set when the item of data includes sufficient information to produce all the images in the set.

An image or image set "includes" information indicating a thing, an event, or a characteristic if an item of data indicating the thing, event, or characteristic can be obtained by operating on an item of data defining the image or image set.

A "data transmission" is an act that physically transmits data from one location to another. A "facsimile transmission" is a data transmission in which the transmitted data define an image set according to a standard format. An "image destination" is a machine or other destination to which data defining an image can be transmitted. A "fax machine" is a machine with circuitry that can receive and provide facsimile transmissions.

Therefore, the telephone number of a fax machine is an example of information that indicates an image destination.

A "marking medium" is a physical medium on which a human can produce a pattern of marks by performing marking actions or by performing actions that modify marks, such as erasing, wiping, or scratching actions. Common examples of marking media include sheets of paper and plastic, although humans can produce patterns of marks on an enormous variety of media. As used herein, "marking medium" covers one or more distinct units of a medium on which, together, a human has produced a pattern of related marks. For example, a set of paper pages that form a handwritten letter would be a single marking medium. Also, as used herein, "marking medium" includes a marking surface of an electronic device that can sense marks, such as a tablet, a touch- or signal-sensitive display, or another pen- or stylus-based input device.

A human "marks" a marking medium or "makes a mark on" a marking medium by performing any action that produces or modifies marks on the marking medium; a human may mark a marking medium, for example, with marking, stamping, erasing, wiping, or scratching actions.

A human makes a mark "by hand" when the human holds an instrument in a hand and moves the instrument across or against the surface of a marking medium to make the mark. The instrument could, for example, be a pen, a pencil, a stylus, a dry marker, a crayon, a brush, a stamp, an eraser, and so forth.

Marks are made "by a machine under control of a human" when the human performs actions that cause the machine to make the marks. The machine could, for example, be a typewriter, a printer, a copier, a fax machine, and so forth.

A "human-produced image" is an image that shows marks made by hand by a human, by a machine under control of a human, or in some other way in which a human can provide marks.

The term "mark" includes a single mark and also plural marks that together form a pattern of marks.

A mark "indicates" a thing, an event, or a characteristic when the presence or shape of the mark depends on the existence or occurrence of the thing, event, or characteristic or on a measure of the thing, event, or characteristic. For example, a mark can indicate a boundary.

A "version" of a first image is a second image produced using an item of data defining the first image. The second image may be identical to the first image, or it may be modified by loss of resolution, by changing the data defining the first image, or by other processes that result in a modified version.

Each location in an image may be called a "pixel." In an array defining an image in which each item of data provides a value, each value indicating the color of a location may be called a "pixel value." A pixel's value in an image that is a version of another image may indicate an attribute of a region of the other image that includes the pixel.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

A "connected component" or "blob" is a set of pixels within a data array defining an image, all of which are connected to each other through an appropriate rule such as that they are neighbors of each other or are both neighbors of other members of the set. A connected component of a binary form of an image can include a connected set of pixels that have the same binary value, such as black. A "bounding box" for a connected component is a rectangle just large enough to include all the pixels in the connected component, and can be specified by coordinates.

A "constraint" on parts of images or of image sets or on features shown by images or by image sets is a requirement or other limitation that the parts or features must satisfy.

An operation uses data to "determine" whether a proposition is true if the operation uses the data to obtain other data indicating whether the proposition is true. For example, an operation can use data defining an image to determine whether parts of the image satisfy a constraint, in which case the operation will obtain data indicating whether the image includes parts that satisfy the constraint.

A criterion is an example of a constraint. If a criterion "requires" a part of an image or of an image set with a characteristic or that has a characteristic, only parts with the characteristic or that have the characteristic meet the criterion.

A first item of data is produced by "applying a criterion" to a second item of data when the first item indicates whether the second item meets the criterion. An operation that applies a criterion produces such an item of data.

A criterion can be "applied" to a connected component or other part of an image or of an image set by applying the criterion to an item of data defining the image in a manner that depends on the connected component or other part. A connected component or other part of an image or of an image set "meets a criterion" if application of the criterion to the part produces an item of data indicating that the part meets the criterion. Numerous criteria can be applied to connected components and other parts of an image or of an image set. For example, a criterion can require a connected component to enclose more pixels or less pixels than the pixels in the connected component; a criterion can require a connected component to be the connected component nearest to another connected component; or a criterion can require a connected component to have a length that is greater than its distance to another connected component.

An operation includes a "sequence of iterations" when the operation includes a sequence of substantially similar suboperations, each referred to as an "iteration," where each iteration after the first uses starting data produced by the preceding iteration to obtain ending data. Each iteration's ending data can in turn be used by the following iteration. A "change occurs" during an iteration if the iteration's ending data is different than its starting data; an iteration during which no change occurs can be the last iteration, because no change will occur during further iterations.

A sequence of iterations "propagates" a constraint if each iteration includes an operation that determines whether items indicated by its starting data satisfy the constraint, and obtains ending data that indicates only the items that satisfy the constraint. For example, if the starting data and ending data define images, the ending data could define an image that includes only the parts of the starting image that satisfy the constraint.

An operation uses data to "determine" whether a proposition is true if the operation uses the data to obtain other data indicating whether the proposition is true. For example, an operation can use data defining an image showing a graphical feature to determine whether the graphical feature satisfies a constraint, in which case the operation will obtain data indicating whether the graphical feature satisfies the constraint.

"Image input circuitry" is circuitry for obtaining data defining images as input.

An "image input device" is a device that can receive an image and provide an item of data defining a version of the image. A "scanner" is an image input device that receives an image by a scanning operation, such as by scanning a document.

"User input circuitry" or "user interface circuitry" is circuitry for providing signals based on actions of a user. User input circuitry can receive signals from one or more "user input devices" that provide signals based on actions of a user, such as a keyboard, a mouse, a joystick, a touch screen, and so forth. The set of signals provided by user input circuitry can therefore include data indicating mouse operation, data indicating keyboard operation, and so forth. Signals from user input circuitry may include a "request" for an operation, in which case a system may perform the requested operation in response.

"Image output circuitry" is circuitry for providing data defining images as output.

An "image output device" is a device that can provide output defining an image.

A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form. To "present an image" on a display is to operate the display so that a viewer can perceive the image.

A "printer" is an image output device that provides an output image in the form of marks on a marking medium.

A "graphical editing operation" or "editing operation" is an operation that uses data defining a first image to obtain data defining a second image which is a modified version of the first image in which a requested change has been made.

An "editing mark" is a mark requesting a change to be made by an editing operation.

A graphical feature is "centered at a position" within an image when a center of area or other central point of the graphical feature is approximately at the position.

An editing operation "would translate" a graphical feature in a first image if the editing operation would obtain data defining a second image in which the graphical feature is centered at a different position within the second image than within the first image. Editing operations that translate graphical features are referred to herein as "move operations," while editing operations that do not translate a graphical feature are referred to as "in-place operations."

A "parameter" of an editing operation is a value that indicates a type of the editing operation or a way in which the editing operation is to be performed. For example, an editing operation that translates or otherwise transforms a graphical feature may have a parameter indicating the extent or degree of transformation.

An editing operation "has been performed on" a graphical feature in a first image if the editing operation obtained data defining a second image in which the requested change has been made, affecting the graphical feature.

A first graphical feature "replaces" a second if, after an editing operation, the first graphical feature is centered at a position at which the second graphical feature was centered before the editing operation, and the second graphical feature no longer appears.

A connected component "encloses" a set of graphical features if the connected component forms a closed curve or boundary around the set.

A "category of graphical representations" is an accepted category of graphical representations, a number of which are mentioned below. In general, graphical representations in each category can have one of a set of configurations or spatial relations between elements within a graphical representation. Each graphical representation in a category of graphical representations thus has a configuration that represents information in a way that is characteristic of the category.

A "structure" is a graphical feature that includes other graphical features that are perceptible as interrelated.

A "node-link structure" is a structure that includes graphical features that can be distinguished into "nodes" and "links" with each link relating two nodes to each other or relating a node to itself. Examples of node-link structures include directed graphs, undirected graphs, trees, flow charts, circuit diagrams, and state-transition diagrams.

A "constraint on nodes" is a constraint that is satisfied by parts of an image or of an image set that show nodes. Similarly, a "constraint on links" is a constraint that is satisfied by parts of an image or of an image set that show links. Also, a "constraint on node-link structures" is a constraint that is satisfied by parts of an image or of an image set that, together, show a node-link structure.

Parts of an image or of an image set or features shown by an image or image set "satisfy a constraint on node-link structures" if the parts or features, taken together, satisfy the constraint.

B. General Features

Figure 1:
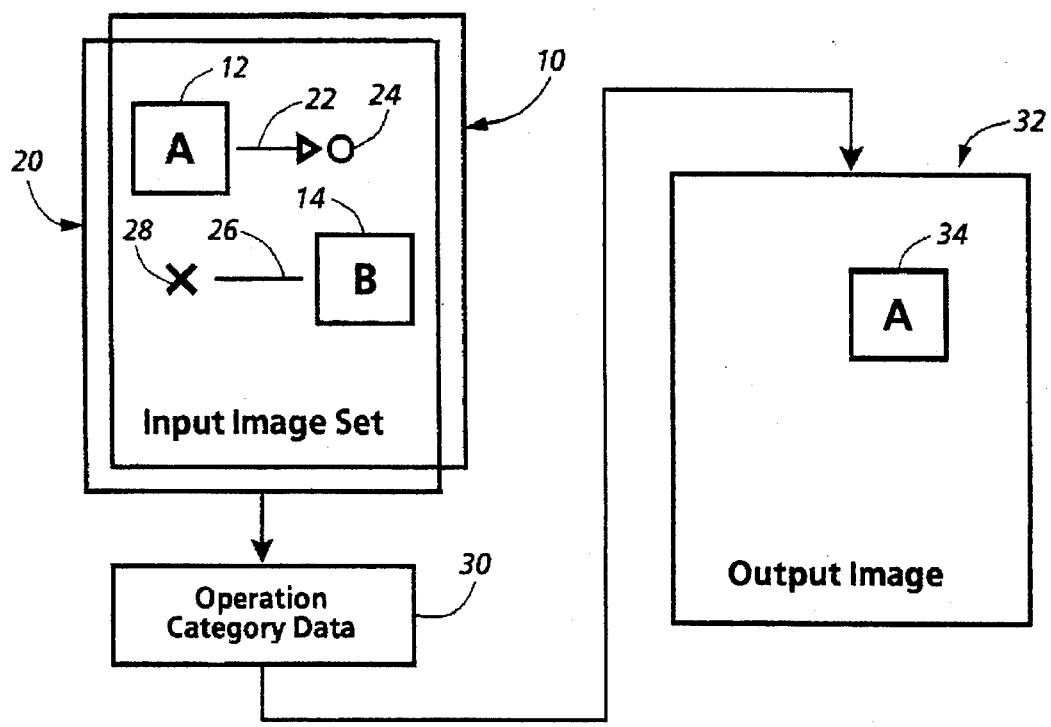
FIG. 1 is a schematic diagram showing how an edited image can be obtained using operation category data.
Figure 2:
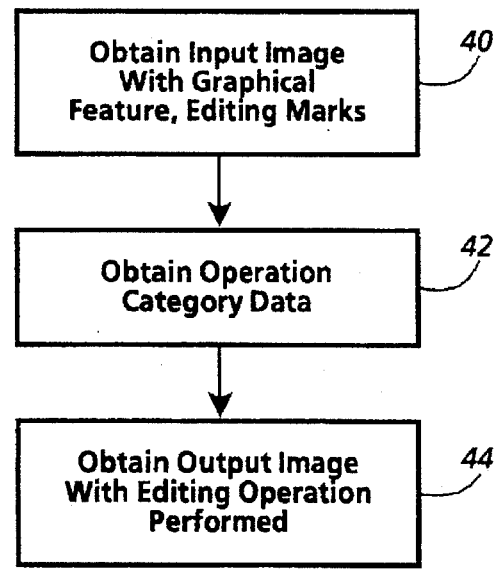
FIG. 2 is a flow chart showing general acts in obtaining an edited image using operation category data.
Figure 3:
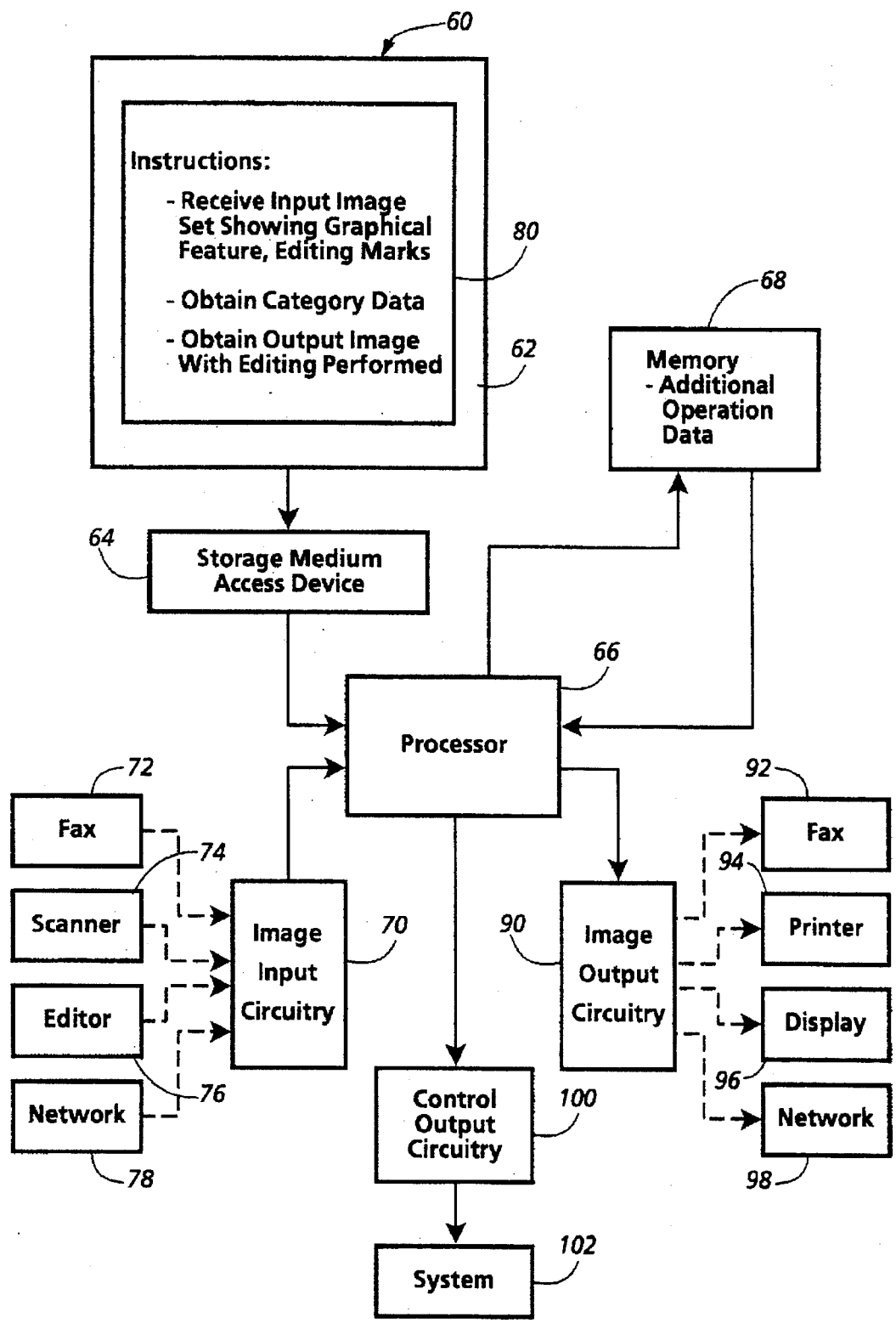
FIG. 3 is a schematic block diagram showing general components of a software product and a machine in which the software product can be used to implement the general steps in FIG. 2.

FIGS. 1–3 show general features of the invention. FIG. 1 shows schematically how operation category data can be used to obtain an edited image. FIG. 2 shows general acts in using operation category data to obtain an edited image. FIG. 3 shows general components of a software product and of a machine in which it can be used.

In FIG. 1, original sheet 10 bears graphical features 12 and 14, while transparent overlay sheet 20 bears editing components 22, 24, 26, and 28, formed by editing marks made by a human on overlay sheet 20. As shown in FIG. 1, when overlay sheet 20 is superimposed on original sheet 10, two simple node-link structures appear, one including graphical feature 12 and editing components 22 and 24 and the other including graphical feature 14 and editing components 26 and 28. Original sheet 10 and overlay sheet 20 can be used to obtain data defining an input image set.

Editing component 22, a directed link, has as its source node graphical feature 12, labeled "A". Its destination node is editing mark 24. Editing component 22 can therefore indicate an editing operation that would translate graphical feature 12 to a different position within the input image set, in this case to a position indicated by editing component 24.

Similarly, editing component 26, an undirected link, has as one node graphical feature 14, labeled "B", and editing component 28 is its other node. Editing component 20 can therefore indicate an editing operation that would not translate graphical feature 14 to a different position within the input image set, but rather would delete it as indicated by editing component 28, illustratively a cross mark or "X".

A machine receiving data defining an input image set that includes sheets 10 and 20 can respond by automatically obtaining operation category data 30 indicating whether each editing operation indicated by editing components 22, 24, 26, and 28 would translate a graphical feature to a different position within the input image set. Then the machine can automatically use operation category data 30 to obtain data defining an image of sheet 32, an output image that is a version of the input image set in which editing operations have been performed. As a result of the operation indicated by editing components 22 and 24, graphical feature 34 is positioned within the output image in the same position editing component 24 has within the input image set. As a result of the operation indicated by editing components 26 and 28, sheet 30 does not include a graphical feature like graphical feature 14.

The general acts in FIG. 2 begin in box 40 by obtaining input image data defining an input image set that shows a graphical feature and editing marks indicating an editing operation to be performed on the graphical feature. In response, the act in box 42 uses the input image data to obtain operation category data indicating whether the editing operation would translate the graphical feature to a different position within the input image set. The act in box 44 then uses the operation category data to obtain output image data defining an output image that shows a version of the input image set in which the editing operation has been performed on the graphical feature.

FIG. 3 shows software product 60, an article of manufacture that can be used in a system that includes components like those shown in FIG. 3. Software product 60 includes data storage medium 62 that can be accessed by storage medium access device 64. Data storage medium 62 could, for example, be a magnetic medium such as a set of one or more tapes, diskettes, or floppy disks; an optical medium such as a set of one or more CD-ROMs; or any other appropriate medium for storing data.

Data storage medium 62 stores data that storage medium access device 64 can provide to processor 66. Processor 66 is connected for accessing memory 68, which can include program memory storing data indicating instructions that processor 66 can execute and also data memory storing data that processor 66 can access in executing the instructions. Memory 68 is illustratively storing additional operation data.

Processor 66 is also connected for receiving data defining images from image input circuitry 70. The data could be obtained from facsimile (fax) machine 72; from scanner 74; from editor 76, which could be a forms editor or other interactive image editor controlled by user input devices such as a keyboard and mouse or a pen- or stylus-based input device; or from network 78, which could be a local area network or other network capable of transmitting data defining an image.

In addition to data storage medium 62, software product 60 includes data stored by storage medium 62. The stored data include data indicating image processing instructions 80, which processor 66 can execute to perform acts like those in FIG. 2. In executing instructions 80, processor 66 receives input image data defining an input image set from image input circuitry 70. The input image set shows a graphical feature and editing marks indicating an editing operation to be performed on the graphical feature. Processor 66 uses the input image data to obtain operation category data indicating whether the editing operation would translate the first graphical feature to a different position within the input image set. Processor 66 then uses the operation category data to obtain output image data defining an output image that includes a version of the input image set in which the editing operation has been performed on the graphical feature. The output image shows the graphical feature in a different position only if the operation category data indicate that the editing operation would translate the graphical feature to a different position within the input image set.

In executing instructions 80, processor 66 can also obtain representation category data indicating a category of graphical representations. The graphical feature is in a graphical representation in the indicated category.

Processor 66 can use the representation category data to access the additional operation data stored in memory 68 and can perform an additional operation that is required if an operation of a certain type is performed on the category of graphical representations.

Processor 66 can also be connected for providing the output image data to image output circuitry 90. The output image data could in turn be provided to fax machine 92, to printer 94, to display 96, or to network 98.

The output image data could also be used to provide control signals. For example, memory 68 could store control instructions processor 66 can execute to use the output image data to obtain control data defining control signals. The control data could be provided to control output circuitry 100, which could respond by providing control signals to system 102.

Rather than being used immediately, the output image data could instead be stored in memory 68 for possible future use.

C. Implementation

The general features described above could be implemented in numerous ways on various machines to analyze marks indicating graphical editing operations. One implementation analyzes input image sets that include graphical features and editing marks and uses the results to provide output images in which editing operations have been performed on graphical features.

1. Image Showing Editing Marks

Figure 4:
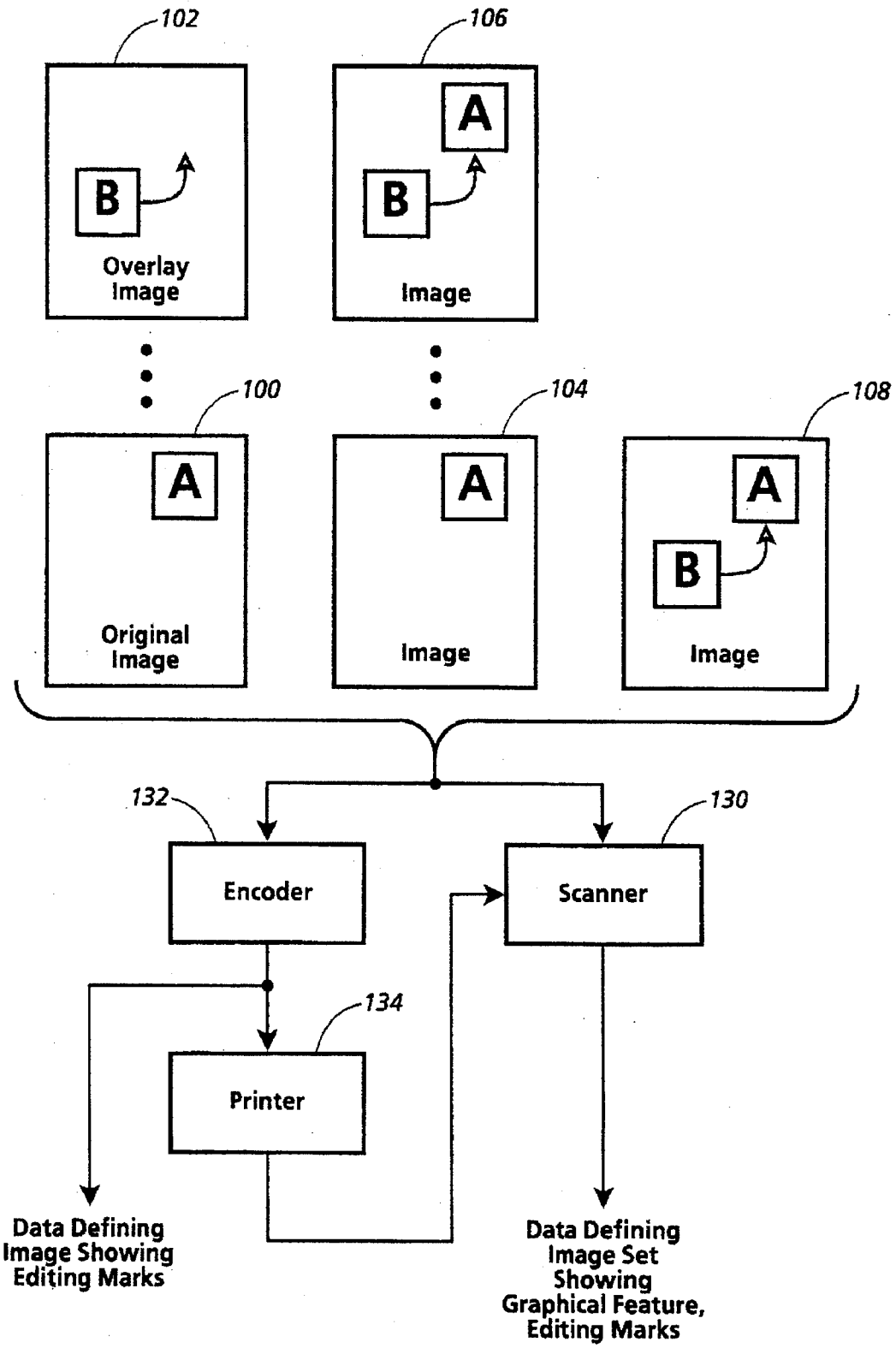
FIG. 4 is a schematic block diagram showing image sets and ways in which a user can provide data defining an image set showing graphical features and editing marks made by hand.
Figure 5:
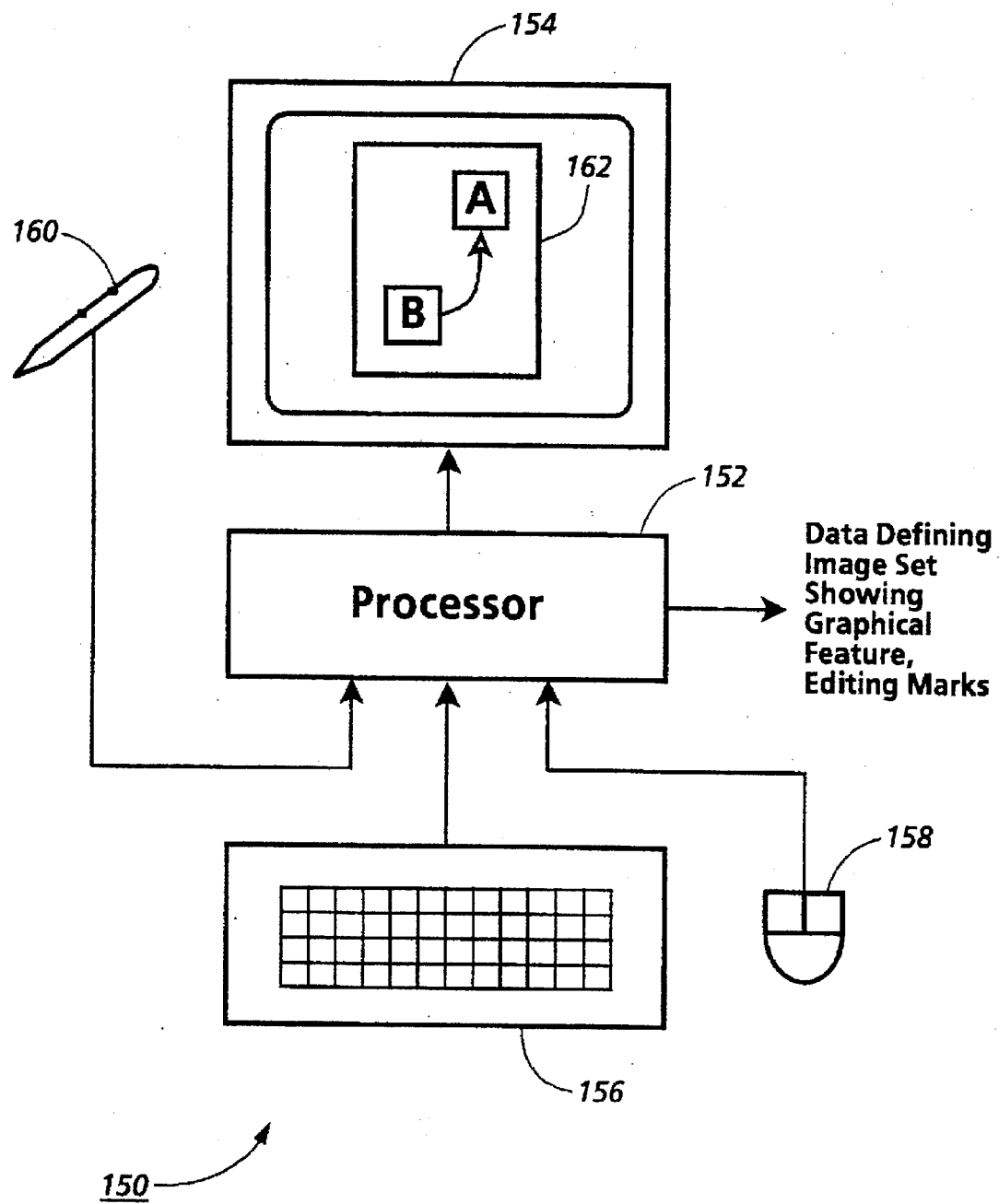
FIG. 5 is a schematic block diagram showing how a user can provide data defining an image showing graphical features and editing marks produced interactively with a machine.

Data defining an image set showing a graphical feature and editing marks can be obtained in many ways. FIG. 4 illustrates ways in which a user can provide an image set showing a graphical feature and editing marks made by hand. FIG. 5 illustrates ways in which a user can provide an image set showing a graphical feature and editing marks by interacting with a machine.

FIG. 4 shows at left several examples of how an image set showing a graphical feature and editing marks can be provided so that the graphical feature and the editing marks can be distinguished. One image set includes images 100 and 102; another includes images 104 and 106; and another includes image 108. Each image set shows a graphical feature, illustratively a rectangle with the letter "A," and editing marks, illustratively a directed link and a node that includes a rectangle with the letter "B." The editing marks can indicate, for example, an editing operation in which the rectangle with the letter "A" is replaced by the rectangle with the letter "B."

In general, the images in FIG. 4 can be obtained in any appropriate way. For example, the editing marks can be made by marking actions performed on a marking medium by hand.

If a marking medium is a sheet, scanner 130 can receive the sheet. Scanner 130 operates on a set of one or more sheets to provide data defining an image set showing a graphical feature and editing marks.

If a marking medium is a marking surface of an electronic device that can sense marks, encoder 132 can receive signals from the electronic device and use the signals to obtain data defining an image showing editing marks. This data can then be provided to printer 134 to obtain a sheet on which marks are printed, and this sheet can be provided to scanner 130. Scanner 130 provides data defining an image showing editing marks.

FIG. 4 also shows that data from encoder 132 could be used directly as data defining an image showing editing marks. This would be appropriate if data defining an image showing a graphical feature could be obtained in another way, such as through scanner 130, and if encoder 132 could provide data defining an image in response to marking actions.

Three specific examples of image sets are illustrated in FIG. 4.

In the first example, the image set includes original image 100 and overlay image 102, each of which can be on a respective sheet provided to scanner 130; the sheet bearing overlay image 102 is sufficiently transparent that it can be superimposed on the sheet bearing original image 100, allowing a user to make the editing marks in appropriate positions. Therefore, when the two sheets are scanned, the graphical feature is shown only in original image 100 while the editing marks are shown only in overlay image 102 and can be easily distinguished from the graphical feature.

If encoder 132 is constructed so that a sheet bearing original image 100 can be positioned beneath a transparent marking surface, overlay image 102 could alternatively be obtained by marking actions on the marking surface of encoder 132. Similarly, if a sheet bearing original image 100 can be scanned and encoder 132 can present the scanned image on its marking surface, overlay image 102 could be obtained from encoder 132.

In the second example, the image set includes images 104 and 106, where image 106 is a version of image 104 with editing marks added to it. Before the editing marks are made, the sheet bearing image 104 can be provided to scanner 130. Then, after the editing marks are made, the sheet bearing image 106 with the editing marks can be provided to scanner 130. In this example, the editing marks can be distinguished from the graphical feature by an image processing operation that, in effect, subtracts image 104 from image 106, leaving only the editing marks.

In the third example, the image set includes image 108, with a graphical feature and editing marks formed with a type of mark that is distinguishable from the graphical feature. For example, editing marks could be formed with a different ink that can be distinguished from a graphical feature because of its color or other optical properties or because of its magnetic properties. In this example, scanner 130 must be capable of providing data indicating which parts of a sheet bear each type of mark. Or editing marks could be distinguished based on geometric or visual properties such as line width or line pattern, whether solid, dotted, dashed, and so forth. For this example, image analysis operations must be performed to distinguish each type of mark.

FIG. 5 shows machine 150, which could be a personal computer, a workstation, or another data processing system. Machine 150 includes processor 152; display 154; keyboard 156; pointing device 158, illustratively a mouse; and screen position indicating device 160, illustratively a stylus. Display 154 can present an image showing a graphical feature. A user can operate keyboard 156 and pointing device 158 to provide signals to processor 152. Or a user can perform marking actions with screen position indicating device 160 on the surface of display 154 to provide signals to processor 152. In response, processor 152 can present on display 154 modified versions of an image that include the graphical feature and editing marks, as illustrated by image 162, so that the user can continue to provide signals until image 162 shows desired editing marks. Then the user can provide a signal requesting that processor 152 provide data defining an image set showing the graphical feature and the editing marks.

Processor 152 could execute a number of types of software to permit a user to produce an image in the manner described above. Processor 152 could execute document editing software or image editing software, for example.

Data defining an image set showing a graphical feature and editing marks could be produced in any of the ways shown in FIGS. 4 and 5, in a combination of the ways shown, or in any other appropriate way.

2. System

Figure 6:
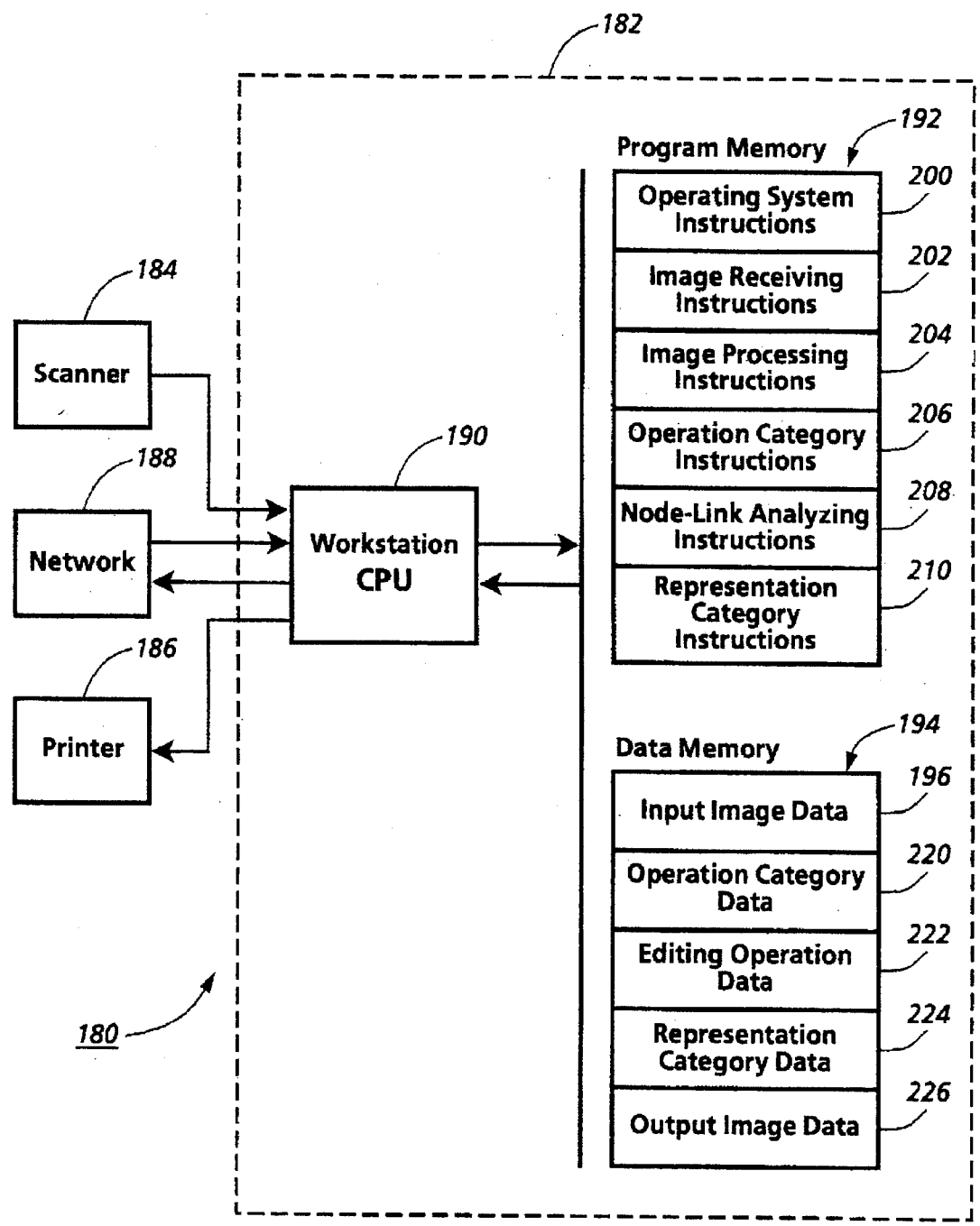
FIG. 6 is a schematic block diagram of a machine that can analyze editing marks to obtain operation category data, editing operation data, and representation category data.

FIG. 6 shows a system in which the general features described above have been implemented.

System 180 in FIG. 6 includes workstation 182, a Sun SPARCStation 10 workstation. Scanner 184 can be a conventional scanner such as a Xerox Datacopy GS Plus scanner. Printer 186 can be a conventional printer such as a Xerox laser printer. Network 188 can be a conventional network operating in accordance with a standard protocol, such as the Ethernet protocol.

Workstation CPU 190 is connected to receive data from scanner 184 and network 188 and is connected to provide data to printer 186 and network 188. For example, CPU 190 can receive data defining an image set showing a graphical feature and editing marks from scanner 184 as described above in relation to FIG. 4. Similarly, CPU 190 can receive data defining an image set obtained in the manner described above in relation to FIG. 5 from network 188. In addition, workstation CPU 190 is connected to access program memory 192 and data memory 194 and other conventional workstation peripherals (not shown).

Program memory 192 stores instructions CPU 190 can execute to perform operations implementing the general acts in FIG. 2. CPU 190 executes operating system instructions 200 that provide a Unix operating system or other appropriate operating system. Each of the other sets of instructions stored by program memory 192 can be obtained from source code in a conventional programming language such as Lisp, C, or the like with conventional compiler or interpreter techniques. When executed, these other instructions make calls to operating system instructions 200 in a conventional manner. In general, the instructions can be obtained from source code in a conventional programming language such as Lisp, C, or the like with conventional compiler or interpreter techniques that produce object code. A machine can store data indicating the source code or the resulting object code on a data storage medium in manufacturing a software product as described above in relation to FIG. 3, with the source code or object code being stored for access by a storage medium access device when the software product is used in a machine like system 180.

In executing image receiving instructions 202, CPU 190 receives data defining an image set and stores it in data memory 194, as illustrated by input image data 196. The data defining the image set may be received from scanner 184 or network 188.

In executing image processing instructions 204, CPU 190 can call operation category instructions 206, which can include calls to node-link analyzing instructions 208. If appropriate, CPU 190 may also call representation category instructions 210.

In executing operation category instructions 206, CPU 190 can call node-link analyzing instructions 208 to perform basic geometric analysis of the image set defined by image data 196, producing operation category data 220. Operation category data 220 indicate, for each editing operation, whether the operation would translate a graphical feature to a different position within the image set defined by image data 196.

Using operation category data 220, CPU 190 can obtain editing operation data 222 indicating, for example, whether the editing marks indicate a delete operation or other specific operations. If the editing marks indicate an operation of a type that could require an additional operation, CPU 190 can call representation category instructions 210 to obtain data indicating a category of graphical representations applicable to the graphical representation that includes the graphical feature being deleted. In executing representation category instructions 210, CPU 190 can call node-link analyzing instructions 208 to perform basic geometric analysis, producing representation category data 224. CPU 190 can use category data 224 and the type of the editing operation to determine whether an additional operation is required and, if so, can perform the additional operation. For example, if the graphical representation is a directed graph and the operation is a delete operation, other graphical features that relate only to the graphical feature being deleted can also be deleted.

Finally, in executing image processing instructions 204, CPU 190 produces output image data 226, defining an output image in which the editing operations indicated by the editing marks have been performed. CPU 190 can then provide output image data 226 to printer 186 for printing or network 188 for transmission to an image destination.

3. Editing

Figure 7:
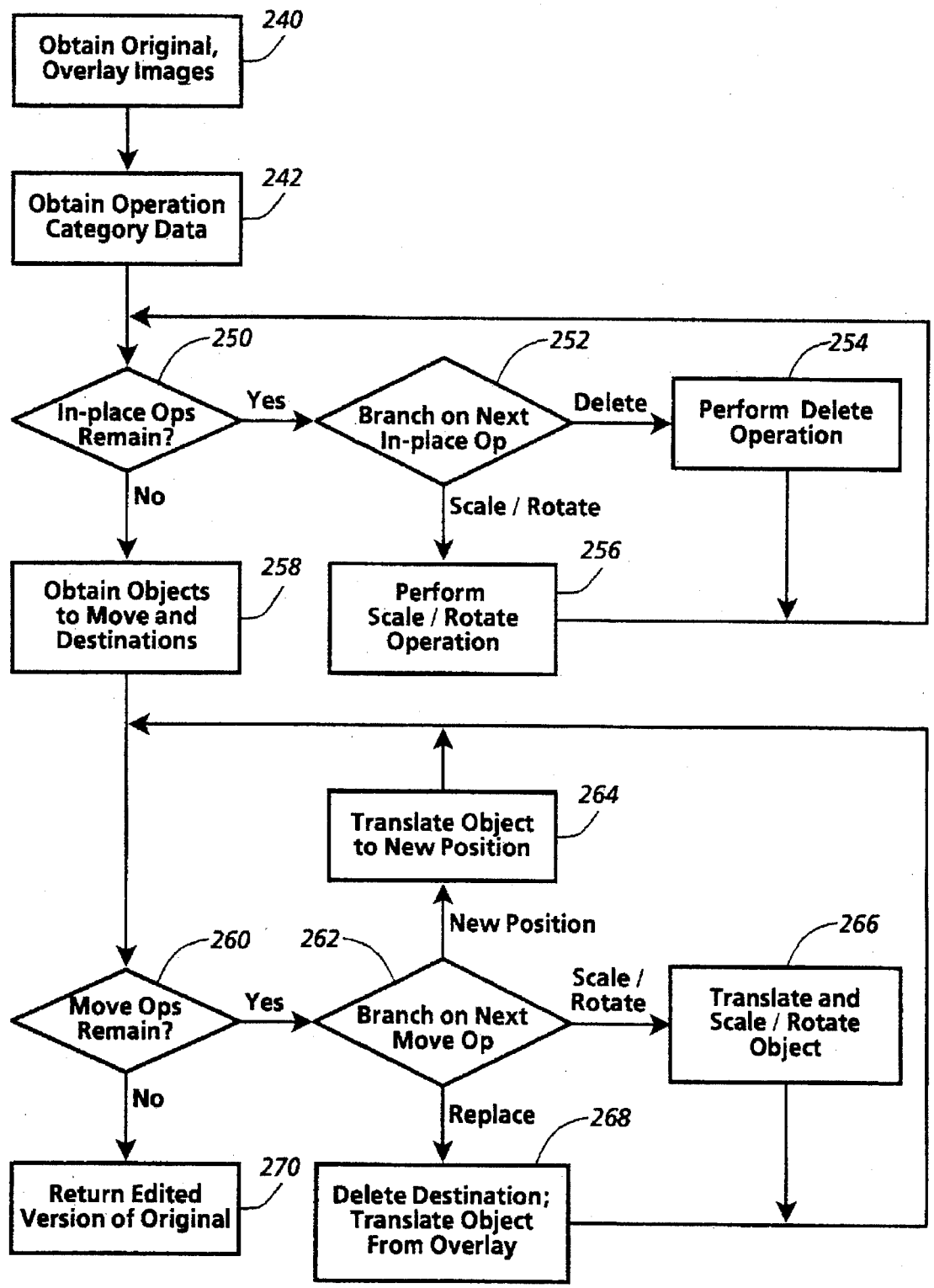
FIG. 7 is a flow chart of acts performed by the system of FIG. 6 in performing editing.

FIG. 7 shows acts performed by CPU 190 in executing image processing instructions 204. The act in box 240 begins by receiving data defining an image set that includes an original image and an overlay image, as illustrated by images 100 and 102 in FIG. 4. Data defining the image set may have been received previously by executing image receiving instructions 202.

The act in box 242 calls operation category instructions 206 to obtain operation category data 220. Operation category data 220 can, for example, include data defining two images in each of which each node-link structure indicates an operation. In one image, each node-link structure indicates a move operation; in the other, each node-link structure indicates an in-place operation.

The act in box 250 begins an iterative loop that handles each node-link structure that indicates an in-place operation. The act in box 252 branches on the specific in-place operation indicated. The implementation supports delete operations and scale/rotate operations. The act in box 254 performs a delete operation, and the act in box 256 performs an in-place operation.

When all the in-place operations have been performed, the act in box 258 prepares to perform the move operations by obtaining two images, one showing the objects to be moved and the other showing the destinations. Then, the act in box 260 begins an iterative loop that handles each node-link structure that indicates a move operation. The act in box 262 branches on the specific move operation indicated. The implementation supports three types of move operations: In one, the act in box 264 simply translates an object in the original image to another position; in another, the act in box 266 translates an object in the original image and performs a scale/rotate operation on it; and in the third, the act in box 268 replaces an object in the original image by deleting it and translating an object from the overlay image to its position.

Finally, the act in box 270 returns output image data 226 defining a version of the original image in which all the editing operations have been performed. The act in box 270 could also call image providing instructions 212 to provide output image data 226 to printer 186 for printing or to network 188 for transmission to an image destination.

Figure 8:
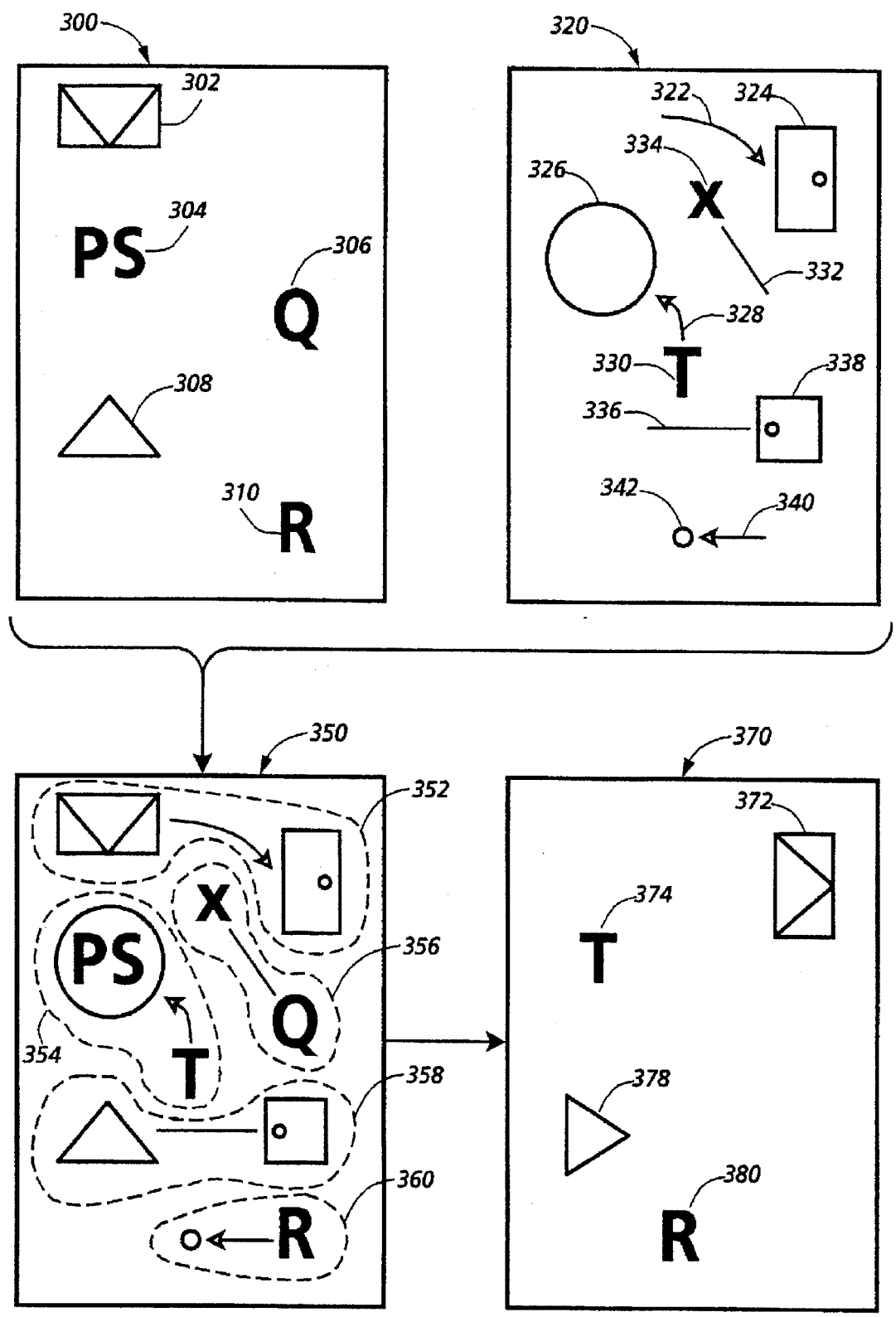
FIG. 8 is a schematic diagram showing ways in which two sheets can show nodes and links that together define node-link structures indicating editing operations.

FIG. 8 illustrates schematically how a number of editing operations can be performed using data defining one original image and one overlay image. The illustrated operations include both in-place operations and move operations.

In FIG. 8, original image 300 shows features 302, 304, 306, 308, and 310. Overlay image 320 shows editing marks 322 through 342, made by a user. Editing marks 322 and 324 request a translate and scale/rotate operation on feature 302. Editing marks 326, 328, and 330 request a replace operation on feature 304. Editing marks 332 and 334 request a delete operation on feature 306. Editing marks 336 and 338 request a scale/rotate operation on feature 308. And editing marks 340 and 342 request a translate operation on feature 310.

Image 350 shows overlay image 320 superimposed on original image 300. Five node-link structures are shown, 352 through 360. Structures 352, 354, and 360 satisfy a constraint on directed graphs; therefore, the editing marks in structures 352, 356, and 360 request move operations. Structures 356 and 358 satisfy a constraint on undirected graphs; therefore, the editing marks in structures 356 and 358 request in-place operations.

Image 370 is an output image, a version of original image 300 produced in response to the editing marks in overlay image 320. As shown, a translate and scale/rotate operation on feature 302 produced feature 372. A replace operation on feature 304 produced feature 374. Feature 306 has been deleted. A scale/rotate operation on feature 308 produced feature 378. And a translate operation on feature 310 produced feature 380.

4. Operation Category Data

Figure 9:
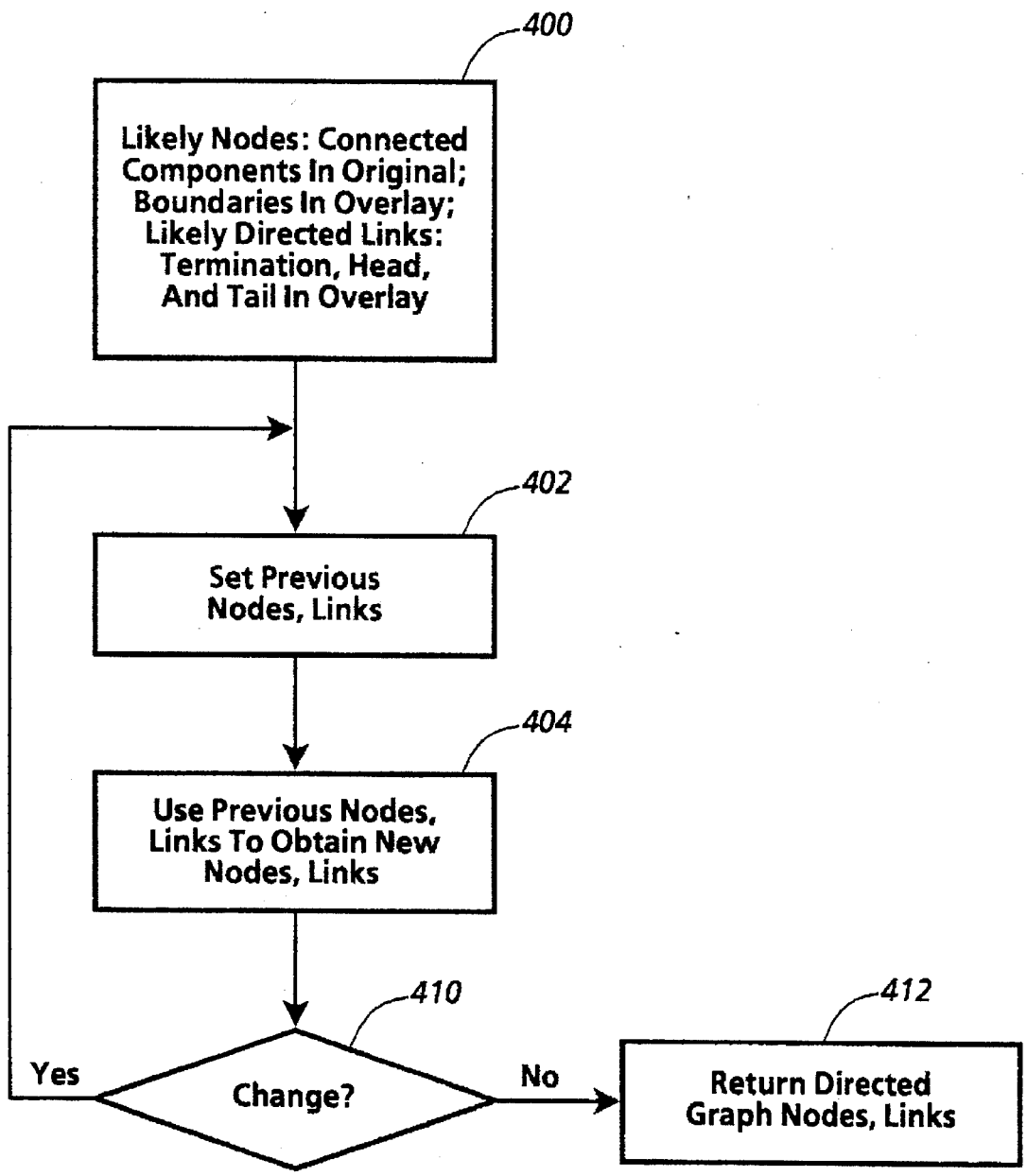
FIG. 9 is a flow chart showing acts in obtaining data indicating move operations.
Figure 10:
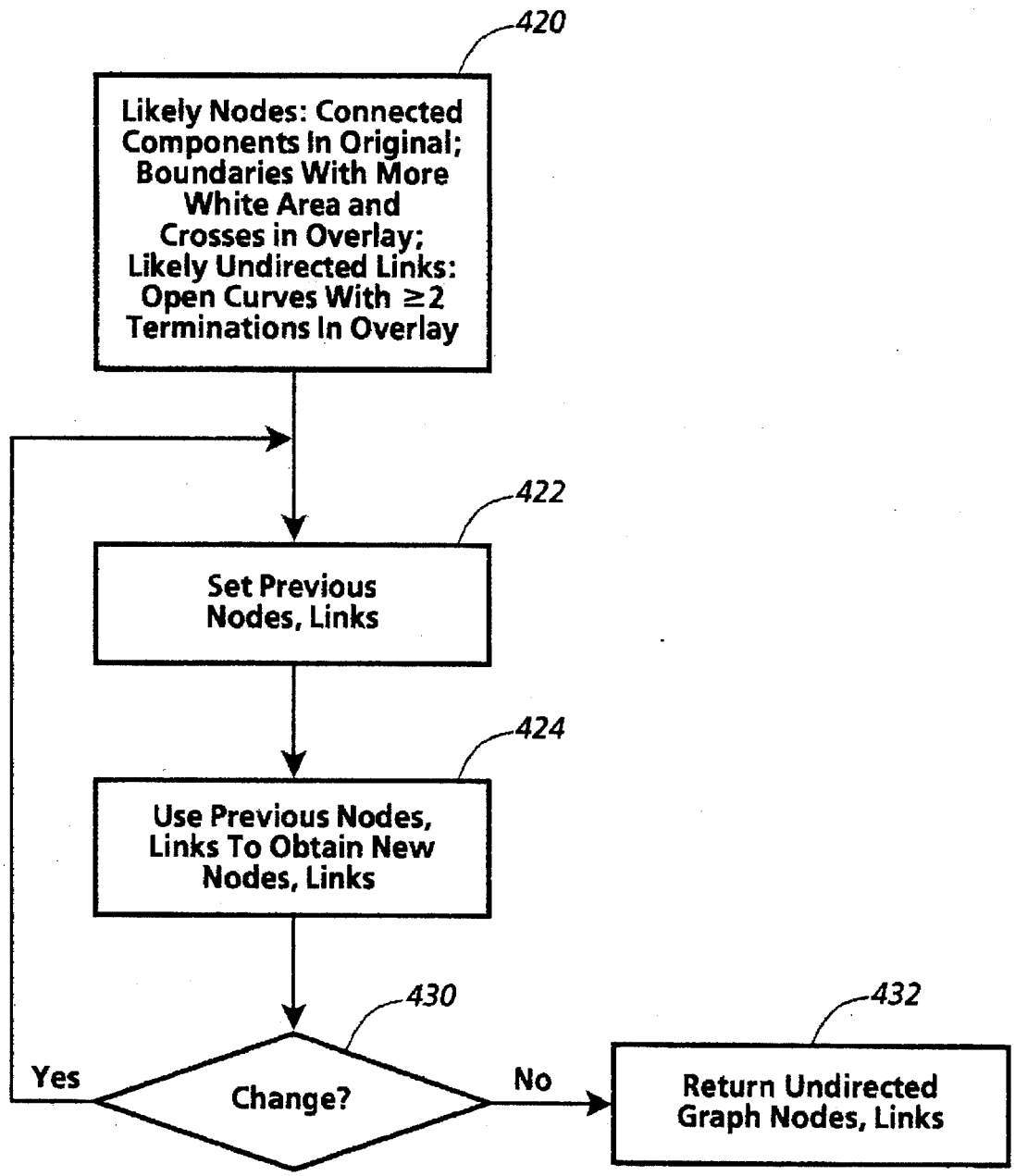
FIG. 10 is a flow chart showing acts in obtaining data indicating in-place operations.

Operation category instructions 206, which perform the act in box 242 in FIG. 7, can be implemented using techniques described in copending, coassigned U.S. patent application Ser. No. 08/157,600 now issued as U.S. Pat. No. 5,522,022, entitled "Analyzing a Sketch of a Node-Link Structure" ("the Node-Link Structure Application"), incorporated herein by reference, performed by calls to node-link analyzing instructions 208. FIG. 9 shows how techniques from the Node-Link Structure Application can be used to obtain data indicating move operations. FIG. 10 shows how techniques from the Node-Link Structure Application can be used to obtain data indicating in-place operations.

The act in box 400 in FIG. 9 begins by obtaining data indicating parts of an input image set that satisfy constraints on nodes, on directed links, and on node-link structures; such parts form node-link structures that are referred to herein as "directed graphs." Techniques like those described in relation to FIG. 7 of the Node-Link Structure Application can be used to obtain two data images, one including likely nodes that satisfy the constraint on nodes and the other including likely directed links that satisfy the constraint on directed links.

As in the Node-Link Structure Application, the term "data image" refers herein to an item of data that defines an image, and all of the data images in a sequence define images with the same number of pixels, each operation producing an image with the same number of pixels. An operation on two images typically uses values of pairs of pixels to produce, for each pair, a pixel value in an image being produced; within each pair, one pixel is from each image and the two pixels in the pair are both at the same location as the pixel value in the image being produced.

The constraint on nodes can include two alternative criteria. First, an original part criterion can require a connected component from the original image. Second, an overlay part criterion can require a connected component from the overlay image that is not enclosed by any other connected component but itself encloses at least some white area, referred to as a "boundary connected component" and explained in more detail in relation to FIG. 7 of the Node-Link Structure Application. Techniques like those described in relation to FIG. 7 of the Node-Link Structure Application can be used to obtain an image that includes connected components meeting the overlay part criterion.

The constraint on directed links can include a criterion requiring a connected component in the overlay image that has at least one termination, that has a part that meets a head criterion and that has a part that meets a tail criterion. The head and tail criteria can be as described in relation to FIG. 7 of the Node-Link Structure Application.

The act in box 402 begins an iterative loop as in FIG. 8 of the Node-Link Structure Application. In the first iteration, the act in box 402 sets the data images received in box 400 to be the previous nodes and previous links. Then, the act in box 404 uses the previous nodes and previous links from box 402 to obtain new nodes and new links. The act in box 404 can be implemented as shown in FIGS. 9 and 10 of the Node-Link Structure Application.

The act in box 410 compares the previous nodes and links with the new nodes and links. If there is a change, the act in box 402 begins another iteration by setting the new nodes and links from the previous iteration as the previous nodes and links. If there is no change, the act in box 412 returns the new nodes and links, which form a directed graph.

The act in box 420 in FIG. 10 begins by obtaining data indicating parts of an input image set that satisfy constraints on nodes, on undirected links, and on node-link structures; such parts form node-link structures that are referred to herein as "undirected graphs." Techniques like those described in relation to FIG. 7 of the Node-Link Structure Application can be used to obtain two data images, one including likely nodes that satisfy the constraint on nodes and the other including likely undirected links that satisfy the constraint on undirected links. As in FIG. 9, techniques like those described in relation to FIG. 7 of the Node-Link Structure Application can be used to obtain the two data images.

The constraint on nodes can again include three alternative criteria. First, an original part criterion can require a connected component from the original image. Second, an overlay boundary criterion can require a boundary connected component in the overlay that encloses more white area than its own area. Third, an overlay cross criterion can require a connected component that meets a criterion for crosses. Techniques like those described in relation to FIG. 7 of the Node-Link Structure Application can be used to obtain an image that includes connected components meeting the overlay boundary criterion.

The crosses criterion can require that a connected component have a cross shape. This criterion can be applied to the overlay image by first obtaining an open curves data image that includes only those connected components that are open curves, as described in relation to FIG. 7 of the Node-Link Structure Application. The open curves data image can be obtained by filling the boundary connected components and then performing a set difference operation to remove the filled boundary connected components from the overlay image. This removes closed curves and their contents.

The cavities of each open curve can then be counted: First, two data images can be obtained using the open curves data image, one a cavities data image as described in relation to FIG. 7 of the Node-Link Structure Application, and the other a hulls data image that is the union of the open curves data image with its three-way and four-way cavities as described in relation to FIG. 7 of the Node-Link Structure Application.

Then a count of cavities in each hull can be performed by obtaining a shrink data image in which each connected component in the cavities data image is replaced by a single black pixel as described in relation to FIG. 7 of the Node-Link Structure Application; then, a spread operation as described in relation to FIG. 7 of the Node-Link Structure Application can be performed to add the number of black pixels within each connected component in the hulls data image and label each pixel in the connected component with the result to obtain a count data image.

Each pixel that is in a connected component in the overlay image and that has a label of four in the count data image meets the crosses criterion.

The constraint on undirected links can include a criterion requiring a connected component in the overlay image that has at least two terminations, as described in relation to FIG. 7 of the Node-Link Structure Application.

The act in box 422 begins an iterative loop like the act in box 402 in FIG. 9. Then, the act in box 424 uses the previous nodes and previous links from box 422 to obtain new nodes and new links, as in box 404 in FIG. 9.

The act in box 430 compares the previous nodes and links with the new nodes and links. If there is a change, the act in box 422 begins another iteration by setting the new nodes and links from the previous iteration as the previous nodes and links. If there is no change, the act in box 432 returns the new nodes and links, which form an undirected graph.

The data images returned in box 412 in FIG. 9 can then be used to perform the iterative loop that begins with box 250 in FIG. 7, and the data images returned in box 432 in FIG. 10 can then be used to perform the iterative loop that begins with box 260 in FIG. 7. In each case, the connected components in the links data image can each be labeled with a unique identifier, and each link can be handled separately.

a. In-Place Operations

For an undirected link, the act in box 252 can use the undirected links data image from box 432 in FIG. 10 to obtain a terminations data image as described in relation to FIG. 7 of the Node-Link Structure Application. Then, the terminations data image can be ANDed with a data image of the undirected link being handled to obtain a data image of the undirected link's terminations. The data image of the undirected link's terminations, called the first data image, and the undirected nodes data image from box 432 in FIG. 10, called the second data image, can then be used to obtain a closest objects data image showing the undirected graph nodes that are nearest to the undirected link's terminations.

The closest objects data image can be obtained by first obtaining x and y offset distance data images as described in relation to FIG. 9 of the Node-Link Structure Application. Each pixel is labeled in the distance data images with its x and y offsets to the nearest connected component in the second data image. Then, the value of each pixel in the first data image is written to the location indicated by its x and y offsets in the distance data images, writing the maximum value in the event of a collision, to obtain a near neighbor data image in which near neighbor pixels are ON. Each connected component in the second data image that includes an ON pixel in the near neighbor data image is then colored to obtain the closest objects data image.

A test is performed to ensure that the undirected link being handled has two and only two nearest nodes in the closest objects data image. If so, the act in box 252 first applies the crosses criterion to each node to find a node that indicates a delete operation; if one node in the overlay meets the crosses criterion, the act in box 254 is performed on the other node, as described in greater detail below. If neither node meets the crosses criterion, the act in box 252 applies an overlay/rectangle criterion to each node to find a node in the the overlay that is a rectangle; if one node meets the overlay/rectangle criterion, the act in box 256 is performed, as described in greater detail below.

The overlay/rectangle criterion can be applied by first ANDing a data image of the node with the overlay image and then comparing the result with the data image of the node; if the two are equal, the node is in the overlay image. Then, a rectangle criterion is applied to the node.

The rectangle criterion can be applied directly to the node's data image. First, a boundaries data image can be obtained, as described in relation to FIG. 7 of the Node-Link Structure Application. Then, an orientation data image is obtained from the boundaries data image. Then, the first and second modes from the orientation data image are obtained, and an angular difference between the two modes is obtained. If the angular difference is at least 80 degrees and no more than 100 degrees, the node meets the rectangle criterion.

To obtain the orientation data image, four edge data images can first be obtained, as described in relation to FIG. 7 of the Node-Link Structure Application. Then, the edge data images can be used to obtain eight edge pair data images, one each in each horizontal direction, in each vertical direction, and in each diagonal direction, each edge pair data image being obtained by shifting one of the edge data images and taking the intersection with itself if a horizontal or vertical direction or an intersection with another of the edge data images if a diagonal direction. Four quadrant data images can then be obtained by adding, at each pixel, the values from three of the edge pair data images-one horizontal, one vertical, and the diagonal between the horizontal and vertical edge pairs. The quadrant data images can then be used to obtain a local orientation data image. For each pixel, the local orientation is the arctangent of a ratio derived from the edge pair values for the quadrant in whose quadrant data image the pixel has the greatest value: The numerator is the sum of the diagonal edge pair and the horizontal edge pair for the quadrant and the denominator is the sum of the diagonal edge pair and the vertical edge pair for the quadrant. In the second and fourth quadrants, the sign of the ratio is negative. The local orientation data image can then be translated by half the width and half the height of a region to obtain the orientation data image.

b. Move Operations

Before directed links are handled by the second iterative loop, the act in box 258 uses the directed nodes data image from box 412 in FIG. 9 to obtain data images of objects to move and their destinations. The objects to move data image and the destination data image can be obtained as described for nearest neighbors of heads and tails in relation to FIG. 9 of the Node-Link Structure Application.

The act in box 262 can then use the objects to move and destinations data images from box 258 to obtain, for the directed link being handled, an object data image showing its object to be moved and a destination data image showing its destination. These can be closest objects data images obtained as described above using data images of the head and tail of the directed link. The object data image shows the node from the objects to move data image that is closest to the directed link's tail, and the destination data image shows the node from the destinations data image that is closest to the directed link's head.

A test is performed to ensure that the object to be moved and the destination are each a single connected component, by assigning a unique identifier to each connected component and comparing the length of the list of unique identifiers with one. If so, the act in box 262 first applies a new position criterion to the destination; if the destination is in the overlay and meets the new position criterion, the act in box 264 is performed on the object to be moved, as discussed in greater detail below. If the destination does not meet the new position criterion, the act in box 262 applies the rectangle criterion described above to the destination; if the destination is in the overlay and meets the rectangle criterion, the act in box 266 is performed, as discussed in greater detail below. If the destination meets neither of the new position and rectangle criteria or is not in the overlay, the act in box 262 applies a replacement criterion to the object to be moved and the destination; if the replacement criterion is met, the act in box 268 is performed, as discussed in greater detail below.

The replacement criterion can be applied by applying original selection and overlay selection criteria to the destination and object data images, respectively. If both are met, the replacement criterion is met.

The original selection criterion first tests whether the destination is entirely in the original image. If so, the original image is tested to determine whether it includes a directed graph, using techniques described in relation to FIG. 13 of the Node-Link Structure Application. If the original image is a directed graph, the original selection criterion is met by the destination. If the original image is not a directed graph, the original selection criterion is met by the destination together with its contents.

If the destination is not entirely in the original image, a region selection criterion determines whether it is a closed curve in the overlay image that selects at least one object in the original image. This can be done by first testing whether the destination is entirely in the overlay image. If it is, a filled data image for the destination can be obtained as described in relation to FIG. 7 of the Node-Link Structure application, and the filled data image can be ANDed with the original image to obtain the area in the original image enclosed by the destination. The original selection criterion is met by any object or objects in the area in the original image, but is not met if the area is empty.

The overlay selection criterion tests whether the object to be moved is entirely in the overlay. If so, the region selection criterion described above is applied to determine whether it is a closed curve in the overlay image that selects at least one object that is also in the overlay image. If the object to be moved meets the region selection criterion, a filled data image for the object to be moved can be obtained and ANDed with the overlay image to obtain the area in the overlay image enclosed by the object to be moved. The overlay selection criterion is met by any object or objects in the area in the overlay image, but is not met if the area is empty. If the object to be moved does not meet the region selection criterion, the object itself meets the overlay selection criterion.

The following sections describe in greater detail operations performed in boxes 254, 256, 264, 266, and 268 in FIG. 7.

5. Delete Operation

Figure 11:
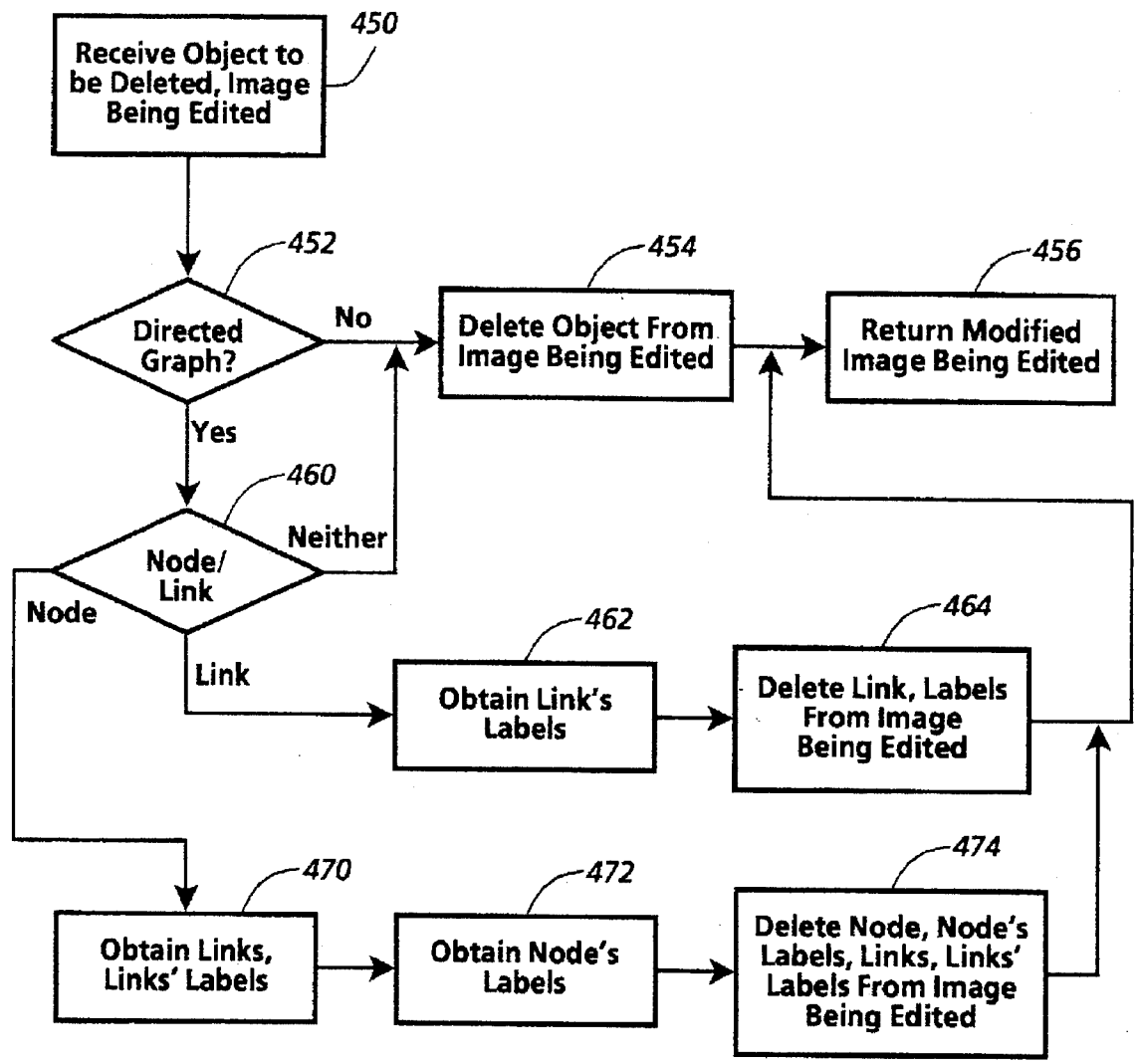
FIG. 11 is a flow chart showing acts in a delete operation in FIG. 7.

Once a node data image is obtained showing a node to be deleted from an image being edited, a delete operation can be easily performed by ANDing the complement of the node data image with the image being edited. The act in box 254 in FIG. 7, however, also makes a call to representation category instructions 210 to determine whether other graphical features should be deleted from an image being edited. FIG. 11 shows acts performed in a delete operation in box 254.

The act in box 450 begins by receiving a call that includes two data images, one a data image of an object to be deleted, such as a node data image, and the other a data image being edited, such as a version of an original image on which editing operations are being performed. The act in box 452 then branches based on whether the image being edited shows a directed graph. The act in box 452 can be implemented by calling representation category instructions 210, as noted above. Representation category instructions 210 can be implemented as described in relation to FIG. 12 of the Node-Link Structure Application, and can determine whether the image being edited includes at least two nodes and at least one link.

If the image being edited does not show a directed graph, the act in box 454 deletes the object by ANDing its complement with the image being edited. Then the act in box 456 returns the modified result as the image being edited.

If the image being edited shows a directed graph, the act in box 460 branches on whether the object is a node or a link in the directed graph. This branch can be based on results of calling node-link analyzing instructions 208 to analyze the image being edited as described in relation to FIGS. 7–10 of the Node-Link Structure Application. Node-link analyzing instructions 208 can return a data image of directed links or a data image of directed graph nodes. The act in box 460 can then test whether the object is in the directed links data image or the directed graph nodes data image.

a. Directed Link Deletion

If the object is a directed link, the act in box 462 obtains a data image showing any other connected components in the image being edited that are labels of the object. This act can be implemented by obtaining a closer points data image and a directed link labels data image and using them to obtain a closest labels data image.

To obtain the closer points data image, the act in box 462 can call node-link analyzing instructions 208 to obtain a directed links data image showing directed links in the image being edited, as described above. The closer points data image is then obtained by labeling each pixel to indicate whether it is closer to the object being deleted than to any other connected component in the directed links data image. To do this labeling, the directed links data image is ORed with the object being deleted and x and y offset distance data images are obtained for the result, as described in relation to FIG. 7 of the Node-Link Structure Application. Then, each pixel is labeled with the value at the pixel's x and y offsets in the data image of the object being deleted to obtain the closer points data image.

To obtain the directed link labels data image, the act in box 462 can call node-link analyzing instructions 208 to obtain a directed links data image and a directed graph nodes data image for the image being edited, as described above. These data images can be used to obtain a possible link labels data image and a closer points data image that are then ANDed to obtain the directed link labels data image.

The act in box 462 can use the directed graph nodes data image to obtain a node labels data image that includes any connected components enclosed by directed graph nodes. The directed links data image, the directed graph nodes data image, and the node labels data image can all be ORed, and the result can be removed from the image being edited to obtain the possible link labels data image.

The act in box 462 can also obtain an extremities data image showing extremities of the directed links data image, as described in relation to FIG. 7 of the Node-Link Structure Application, and the extremities data image can be removed from the directed links data image to obtain a link bodies data image showing the parts of each directed link that are not extremities. The directed graph nodes data image can be used to obtain a filled data image, as described in relation to FIG. 7 of the Node-Link Structure Application. Distances data images can then be obtained for the filled data image and for the link bodies data image, as described in relation to FIG. 7 of the Node-Link Structure Application. The distances data images can be used to obtain the closer points data image in which a pixel is ON if its distance to the nearest object in the link bodies data image is shorter than its distance to the nearest object in the filled data image, meaning in effect that it is closer to the body of a directed link than it is to a directed graph node.

The possible link labels data image can be ANDed with the closer points data image to obtain the directed link labels data image, in which a pixel is ON if it is not a directed link, a directed graph node, or a node label and is closer to the body of a directed link than it is to a directed graph node. As noted above, the directed link labels data image can then be ANDed with the closest labels data image to obtain the labels data image for the directed link being deleted.

The act in box 464 can then OR the data image showing the directed link being deleted and its labels data image to obtain a data image showing the connected components to be deleted. The complement of this data image can then be ANDed with the image being edited to complete the deletion, and the resulting modified version of the image being edited can be returned in box 456, as above.

b. Directed Graph Node Deletion

If the act in box 460 determines that the object to be deleted is a directed graph node, somewhat different acts are performed.

The act in box 470 obtains a links data image showing links that are close to the node and a links' labels data image showing labels of the link shown in the links data image. The links data image can be a closest objects data image, obtained as described above in relation to in-place operations using the node data image showing the node to be deleted and a directed links data image obtained from the image being edited as described above. Each pixel in the links data image is therefore ON if it is in a connected component in the directed links data that is the closest directed link to a pixel in the node to be deleted.

The act in box 470 can use the links data image to obtain the links' labels data image using the techniques described above in relation to box 462. The act in box 470 can then OR the links data image and the links' labels data image to obtain a link structure data image showing the links and link labels to be deleted with the node.

The act in box 472 can obtain a node's labels data image using the image being edited and the node data image showing the node to be deleted. The act in box 472 can use the node data image to obtain a filled data image, as described in relation to FIG. 7 of the Node-Link Structure Application. The act in box 472 can also use the image being edited to obtain a contents data image that includes all connected components enclosed by directed graph nodes in the image being edited. The act in box 472 can AND the filled data image with the contents data image to obtain the node's labels data image showing any connected components enclosed by the node to be deleted. The act in box 472 can then OR the node's labels data image with the link structure data image from box 470 and with the node data image to obtain a node structure data image showing the node to be deleted, any labels it encloses, any links closest to it, and any labels of those links.

The act in box 474 can then delete the items shown in the node structure data image by ANDing the complement of the node structure data image with the image being edited. The resulting modified version of the image being edited can be returned in box 456, as described above.

6. Translate Operation

Each of the acts in boxes 264, 266, and 268 in FIG. 7 includes a translate operation. In addition, a scale/rotate operation as in boxes 256 and 266 can be implemented using a translate operation as described below.

FIG. 12 shows acts in a translate operation, whether part of a scale/rotate operation in box 256 or box 266 or part of a move operation in box 264, box 266, or box 268. Each of the move operations in boxes 264 and 266 also includes a delete operation, not shown in FIG. 12, that simply deletes the object to be moved from the current version of the image being edited. Similarly, the move operation in box 268 also includes a delete operation, not shown in FIG. 12, that deletes the destination from the current version of the image being edited. After this deletion operation, the modified image being edited can be ORed with the translated version of the object to be moved to obtain a version of the image being edited in which the translation operation has been performed.

The act in box 480 in FIG. 12 begins by receiving two data images, one showing an object to be moved and the other showing a destination. These data images can be obtained as described above in relation to move operations or, during a scale/rotate opeation, the destination can be the object being scaled or rotated prior to scaling or rotation.

The act in box 482 obtains data indicating a displacement vector from the object to be moved to the destination. The displacement vector can include two items of data, one indicating x displacement and the other indicating y displacement.

To obtain the displacement vector, the act in box 482 can use each of the data images from box 480 to obtain a respective list of four coordinates that define a bounding box around the object to be moved for one image and the destination for the other. The act in box 482 can then obtain the coordinates of the center of each bounding box, rounded to the nearest integer, and the displacement vector can include the differences obtained by subtracting the x and y coordinates of the object to be moved from the x and y coordinates of the destination.

The act in box 484 then uses the data image showing the object to be moved to obtain a translated data image showing the same object centered at the position of the destination. This can be done simply by writing the value of each pixel in the data image showing the object to be moved to the pixel that is displaced from it according to the displacement vector.

7. Scale/Rotate Operation

The acts in boxes 256 and 266 in FIG. 7 each include a scale/rotate operation.

FIG. 13 shows acts in a scale/rotate operation, whether part of an in-place operation in box 256 or a move operation in box 266. In either case, the scale/rotate operation is indicated by editing marks in the overlay image that form a rectangular connected component referred below to as a "rectangle" and a small internal connected component inside the rectangle referred below to as a "dot." The dimensions of the rectangle indicate a size to which a graphical feature can be scaled and the dot's position indicates the side of the rectangle to which the previous base of the graphical feature can be rotated.

The act in box 500 begins by receiving two data images, one showing the object to be scaled/rotated, the other showing a rectangle with a dot. The act in box 502 uses the data image showing a rectangle with a dot to obtain two other data images, one showing the rectangle and the other showing the dot. The rectangle data image can be obtained as a boundaries data image, as described in relation to FIG. 7 of the Node-Link Structure Application. The dot data image can be obtained as an internals data image, also described in relation to FIG. 7 of the Node-Link Structure Application. The act in box 502 can also include testing the rectangle data image using the technique described above in relation to boxes 252 and 262 in FIG. 7 to ensure that it meets the rectangle criterion.

The act in box 504 uses the rectangle data image and the dot data image to obtain parameters of a scale/rotate operation. The parameters illustratively include the length of the side of the rectangle closest to the dot, referred to as the "base"; the height of the rectangle from the base to the opposite side; and the orientation of the base, measured as an angle of rotation from the x axis.

To obtain the parameters, the act in box 504 can obtain first and second orientation mode data images showing regions of the rectangle data image that include connected pixels extending at first and second modes of orientation, as described above in relation to in-place operations. The act in box 504 can obtain a first orientation mode data image showing each pixel with the first mode of orientation and a second orientation mode data image showing each pixel with the second mode of orientation.

The act in box 504 can use the first and second orientation mode data images to obtain first and second possible sides data images. To obtain the first possible sides data image, the connected components in the second orientation mode data image are removed from the boundaries data image; then each remaining connected component that includes a black pixel in the first orientation mode data image is extracted. Similarly, to obtain the second possible sides data image, the connected components in the first orientation mode data image are removed from the boundaries data image; then each remaining connected component that includes a black pixel in the second orientation mode data image is extracted.

The act in box 504 can obtain a corners data image by ANDing the first and second possible sides data images. It can obtain a first sides data image by removing the second possible sides data image from the first possible sides data image. And it can obtain a second sides data image by removing the first possible sides data image from the second possible sides data image. Finally, it can obtain a base data image by ORing the sides data images and using the result and the dot data image to obtain a closest objects data image, as described above.

The act in box 504 can use the first and second sides data images and the corners data image to obtain approximate base length and height. A width data image can be obtained for each sides data image, as described in relation to FIG. 7 of the Node-Link Structure Application. The mode of width can be obtained from the width data image by finding the most frequent value, and the mode serves as a denominator. Similarly, the area of each sides data image can be obtained by adding the number of ON pixels, and is added to one-half the area of the corners data image to obtain a numerator. The numerator can be divided by the denominator, in effect dividing area by width, and the result can be multiplied by one-half and rounded to the nearest integer to obtain approximate side length.

The act in box 504 can return a base length that is the approximate length of the sides data image that includes the base data image. It can return a height fiat is the approximate length of the other sides data image. It can apply the technique described above to the boundaries data image to obtain a region orientation data image in which each pixel is labeled with an orientation, and can return an angle of orientation that is the mode of orientation for the respective orientation mode data image.

The act in box 506 can then use the base length and height from box 504 to scale the object to be scaled/rotated from box 500. The act in box 506 can then perform a translate operation as described above to position the scaled object so that its center is at the same position as its center prior to scaling. The act in box 506 can perform scaling by obtaining, for each pixel, x and y offsets to the pixel in the data image of the object from which a value should be read, and by then using the x and y offsets to read the appropriate value.

The x offset can be obtained, for example, by subtracting the left coordinate of a bounding box around the object from each pixel's x coordinate to obtain a coordinate offset data image. Each pixel's value in the coordinate offset data image can then be multipled by the result of dividing the width of the bounding box by the base length from box 504, and the product can be rounded to the nearest integer to obtain a bitmap offset data image. Each pixel's value from the bitmap offset data image can be added to the left coordinate of the bounding box to obtain a bitmap coordinate data image, and each pixel's x coordinate can be subtracted form its value in the bitmap coordinate data image to obtain the x offset data image. A y offset data image can be similarly obtained, but with the coordinate offset data image being obtained by subtacting the difference between the bottom of the bounding box and the height from box 504 from each pixel's y coordinate.

The act in box 510 then determines whether the angle from box 504 is equal to zero. If so, no rotation is necessary, and the act in box 512 returns a data image showing the scaled and translated object from box 506. But if the angle is not equal to zero, the act in box 514 centers and rotates the scaled and translated object from box 506, then translates it to its previous position.

The act in box 514 can center the object from box 506 by translating the data image to a position at which the number of black pixels to the right and left of the center are equal and at which the number of black pixels above and below the center are equal. The angle from box 514 can be rounded to the closest multiple of 15. Coordinates of a bounding box around the centered object can be obtained.

The act in box 514 can then use the rounded angle to rotate the centered object. The act in box 514 can then perform a translate operation as described above to position the rotated object so that its center is at the same position as its center prior to rotation. The act in box 514 can perform rotation by obtaining, for each pixel, x and y offsets to the pixel in the data image of the object from which a value should be read, and by then using the x and y offsets to read the appropriate value.

To obtain the x and y offsets, the act in box 514 can begin by obtaining x and y origin data images in which, for each pixel, the left coordinate of the bounding box is subtracted from its x coordinate and its y coordinate is subtracted from the bottom coordinate of the bounding box. The origin data images are used to obtain new x and y data images that can then be used to obtain x and y offset data images by subtracting the x origin data image from the new x data image and by subtracting the new y data image from the y origin data image.

The new x data image can be obtained by obtaining, at each pixel, a rounded sum of two values, using the negative of the rounded angle, expressed in radians. One value is the product of the cosine of the rounded angle and the pixel's value from the x origin data image. The other value is the product of the negative of the sine of the rounded angle and the pixel's value from the y origin data image.

Similarly, the new y data image can be obtained by obtaining, at each pixel, a rounded sum of two values, again using the negative of the rounded angle, expressed in radians. One value is the product of the sine of the rounded angle and the pixel's value from the x origin data image. The other value is the product of the cosine of the rounded angle and the pixel's value from the y origin data image.

The act in box 516 returns a data image showing the scaled and rotated object from box 514, completing the scale/rotate operation.

8. Examples

After an edited image is obtained as described above, it can be provided to a printer or other image output device. FIGS. 14–16 show three examples obtained with the implementation described above.

In FIG. 14, original image 530 shows a number of geometric objects, one of which is an ellipse with the word "circle" under it, another of which is a square, and another of which is a triangle. Overlay image 532 shows a number of editing marks, and image 534 shows overlay image 532 superimposed on original image 530, resulting in three node-link structures: One has an undirected link and a node that is a rectangle with a dot in overlay image 532 and therefore indicates an in-place scale/rotate operation; another has a directed link and a new position destination in overlay image 532 and therefore indicates a move operation without a scale/rotate operation; and the third has a directed link with its source the circled word "ellipse" in overlay image 532 and its destination a circle in overlay image 532 that encloses the word "circle" in original image 530 and therefore indicates a move operation with replacement. Output image 536 shows the triangle scaled and rotated according to the rectangle with a dot; the square translated to a new position; and the word "ellipse" replacing the word "circle."

In FIG. 15, original image 550 shows a number of graphical features, one of which is the word "cat," another of which is a drawing of a cat, and another of which is a drawing of a bowl. Overlay image 552 shows a number of editing marks, and image 554 shows overlay image 552 superimposed on original image 550, resulting in three node-link structures: One has an undirected link and a node that is a cross in overlay image 552 and therefore indicates an in-place delete operation; another has a directed link and a new position destination in overlay image 552 and therefore indicates a move operation without a scale/rotate operation; and the third has a directed link with its source a circle in overlay image 552 that encloses the word "cat" in original image 550 and its destination a rectangle with a dot in overlay image 552 and therefore indicates a move operation with a scale/rotate operation. Output image 556 shows the bowl deleted; the cat translated to a new position, and the word "cat" translated, scaled, and rotated according to the rectangle with a dot. Due to a flaw in the implementation described above, part of the last letter of the word "cat" has been clipped off.

In FIG. 16, image 560 shows an overlay image superimposed on an original image that shows a directed graph. The only editing marks in the overlay image are the cross and the undirected link in the lower part of a number of graphical features which indicate an in-place delete operation for the node in the original image that is labeled "Z". Output image 572 shows how the delete operation has automatically deleted not only the node, but also its label, the two links leading to it, and the labels of the links.

9. Variations

The implementation described above uses overlay images showing editing marks. As described above in relation to FIGS. 4 and 5, however, other implementations could use other techniques to distinguish editing marks from graphical features in an image being edited. Editing marks could be of a different color or could have distinguishing line texture such as solid, dashed, or dotted.

The implementation described above distinguishes between editing marks indicating move operations and in-place operations by distinguishing directed and undirected graphs. Editing marks indicating move operations and in-place operations could be distinguished in other ways. For example, different colors or different line textures could be used for the two categories of operations.

The implementation described above can operate on a human-produced overlay image showing editing marks that satisfy constraints on nodes, on links, and on node-link structures. A machine could be implemented to produce overlay images satisfying the same constraints automatically, in which case the implementation could be applied to a machine-produced overlay image.

The implementation described above uses a crosses criterion to determine whether editing marks indicate a delete operation. Other criteria could be used to determine whether editing marks indicate a delete operation.

The implementation described above uses a rectangle criterion to determine whether editing marks indicate a scaling operation. Other criteria could be used to determine whether editing marks indicate a scaling operation. For example, a scaling operation could be performed if editing marks indicate translation of a feature to a new position, to scale the feature to fit the position. Segmentation of a partially bounded region could be performed to obtain a boundary for the new position, using techniques as described in copending, coassigned U.S. patent application Ser. No. 08/158,053 now issued as U.S. Pat. No. 5,537,491, entitled "Analyzing an Image or Other Data to Obtain a Stable Number of Groups," incorporated herein by reference.

The implementation described above determines whether to perform rotation based on the position of a small connected component within a rectangle indicating a scale operation. Other criteria could be used to determine whether to perform rotation.

The implementation described above perform rotation operations with scaling operations, but scaling and rotation could be performed separately and could be indicated by independent editing marks.

The implementation described above determines whether an editing operation should be performed on a group of connected components together based on whether the connected components are enclosed by another connected component. Other criteria could be used to determine whether to operate on a group of connected components. For example, a grouping or spatial clustering operation could be performed on the original image to obtain a group of connected components to be treated as a node. Grouping operations are described in the Grouping Application.

The implementation described above uses a small connected component as an editing mark to indicate destination of a translate operation without scaling and rotation. Other types of editing marks could be used.

The implementation described above provides two in-place operations-delete and scale/rotate—and three move operations—translate, translate with scale/rotate, and replace. Other sets of operations could be provided. For example, an insert operation could be indicated by including a feature to be inserted on the overlay and using a destination node to indicate the position at which to insert it, with or without a scale/rotate operation. Also, any features on the overlay that do not satisfy the constraints on nodes, links, and node-link structures could be inserted, or features to be inserted could be provided with a distinguishing color or line texture.

The implementation described above can delete related parts of a directed graph when a node or link is deleted. This technique could be extended to other node-link structures such as flow charts and circuit diagrams. This technique could also be extended to other types of operations, including inserting and moving operations, so that necessary additional operations would be automatically performed on related parts. This technique could also be extended to other categories of graphical representations, such as repositioning of other bars when a bar is deleted, inserted, or moved in a bar chart or adjusting other segments when a segment is deleted, inserted, or moved in a pie chart.

The implementation described above handles certain operations in a component-serial fashion, obtaining terminations or distances for each connected component separately and then combining the results. Most other operations are handled in component-parallel fashion. The mix of component-serial and component-parallel operations could be varied in any appropriate way; all operations could be component-parallel, all could be component-serial, or some could be component-parallel and others component-serial.

The implementation described above uses currently available image processing techniques, but could readily be modified to use newly discovered image processing techniques as they become available. For example, component-parallel techniques for obtaining terminations and distances between connected components might be used instead of component-serial techniques; the component-parallel techniques might use Voronoi boundaries or Voronoi regions, for example, spreading minimum distances from locations on a Voronoi boundary.

The implementation described above operates on binary images, but could be extended to operate on color or gray scale images, either directly or after binarization.

The implementation described above uses the results of image analysis to control rendering, but image analysis results could be used for a variety of other purposes. For example, the results of image analysis could be stored to preserve a graphical representation generated during a meeting using a tool such as a computer-controlled whiteboard device, for which user interface techniques are described in copending, coassigned U.S. patent application Ser. No. 07/869,554, continued as application Ser. No. 08/394,919, entitled "Generalized Wiping as a User Interface for Object-Based Graphical Displays," and Ser. No. 07/869,559, now issued as U.S. Pat. No. 5,404,439, "Time-Space Object Containment for Graphical User Interface," both incorporated herein by reference.

One of the advantages of the implementation described above is that the user can draw a relatively simple sketch to indicate a relatively complicated graphical representation that can be rendered automatically in response to the sketch. Therefore, the sketch cannot specify all the relevant parameters of the output image, making it necessary for parameters that are not specified to default sensibly. In the implementation described above, default parameters are supplied by rendering procedures. A user could instead provide defaults, such as in an initialization file. Defaults could be provided for specific categories and for specific rendering systems.

The implementation described above performs acts in a specific order that could instead be performed in another order. In FIG. 7, for example, move operations could be performed before in-place operations rather than after. Also, directed graphs indicating move operations could be obtained just before performing move operations, and undirected graphs indicating in-place operations could be obtained just before performing in-place operations, rather than obtaining both types of graphs in advance.

The implementation described above in relation to FIG. 6 employs a workstation CPU that executes image processing instructions. FIG. 17 shows an alternative implementation that uses an image processing server. This implementation can provide the usual advantages of server architectures, including economy, speed, and sharing of resources.

System 590 in FIG. 17 includes network 592, workstation 594, storage server 596, and image processing server 598. A user can operate workstation 594 to provide requests on network 592 for storage of data defining images, such as from a scanner or other source. In response, storage server 596 can store the data. Then, the user can operate workstation 594 to provide requests for image processing operations like those described above. In response, image processing server 598 can perform the requested operations, executing instructions like those described above in relation to FIG. 6.

D. Application

The invention could be applied in many ways. FIG. 18 shows how the techniques described above could be applied in a personal computer that can operate as a fax server. FIG. 19 illustrates how the techniques described above could be applied in a copier.

System 600 in FIG. 18 includes CPU 602, which can be the CPU of a personal computer such as an IBM PC compatible machine. CPU 602 is connected to receive user input signals from keyboard 604 and mouse 606, and can present images to a user through display 608. CPU 602 is also connected to a number of other peripheral devices, illustratively including disk drive 610, modem 612, scanner 614, and printer 616.

Program memory 620 stores operating system (OS) instructions 622, which can be a version of DOS; user interface instructions 624; fax server instructions 626; and image processing instructions 628. Fax server instructions 626 can be similar to the PaperWorks™ software product described in copending, coassigned U.S. patent application Ser. No. 08/096,198, now U.S. application Ser. No. 08/543,232, entitled "Data Access Based on Human-Produced Images," incorporated herein by reference. Image processing instructions 628 can include image processing instructions 204, operation category instructions 206, node-link analyzing instructions 208, and representation category instructions 210 as described above in relation to FIG. 6 and, in more detail, in relation to FIGS. 7–13. Fax server instructions 626 and image processing instructions 628 could be obtained in the form of a software product stored on a floppy disk, diskette, or CD-ROM, and accessed for storage in program memory 620 by disk drive 610.

Data memory 640 stores input image data 642, operation category data 644, editing operation data 646, representation category data 648, and output image data 650 as described above in relation to FIG. 6 and, in more detail, in relation to FIGS. 7–13.

System 600 can obtain input image data 642 defining an image set that shows a graphical feature and editing marks indicating an editing operation in many ways: Data defining an image set showing a graphical feature and editing marks could be produced interactively as described above in relation to FIG. 5, such as by executing user interface instructions 624. Any appropriate user interface techniques could be used, including pen-based techniques. Data defining a previously produced image set showing a graphical feature and editing marks could be retrieved from a storage medium by disk drive 610. Data defining an image showing a graphical feature and editing marks could be obtained from scanner 614 as described above in relation to FIG. 4. A user could produce data defining an image showing a graphical feature and editing marks elsewhere and provide it to system 600 through modem 612, such as by making a facsimile transmission to modem 612.

CPU 602 could execute fax server instructions 626 in response to a request received by facsimile transmission through modem 612. The request could include a form indicating an editing operation and also indicating an output image destination such as a fax machine or printer 616. The request could also include data defining an image showing a graphical feature and editing marks or could indicate an image previously obtained by system 600.

Fax server instructions 626 could include calls to image processing instructions 628 to perform acts like those shown in FIG. 7 if the request indicates an editing operation. Execution of fax server instructions 626 could further provide data defining an edited output image, which could be provided to modem 612 for facsimile transmission or to printer 616 for printing.

The implementations described above are especially well suited to offline sketch analysis as in FIG. 18 because speed of analysis matters less for offline analysis than it would for online analysis. Also, reliability may matter more for offline analysis than it would for online analysis. As illustrated in FIG. 19, however, the implementations described above may also be applied in online analysis, such as in a copier.

In FIG. 19, copier 660 can be a digital copier or other electronic reprographics system. Scanning circuitry 662 obtains data defining input image set 664 showing a node-link structure. User interface circuitry 670 includes touch sensing device 672, which can be a push button, a heat or pressure sensitive element, a capacitance sensing element, or other device for sensing a touching action. When a user touches device 672, user interface circuitry 670 provides touch data indicating that device 672 has been touched.

Processing circuitry 680 uses the touch data to obtain request data indicating a request for an image analysis operation such as editing. Then, responding to the request, processing circuitry 680 uses data defining input image set 664 to automatically obtain operation category data indicating whether an editing operation would translate a graphical feature to a different position. Processing circuitry 680 then uses the operation category data to obtain output image data defining an output image that includes a version of the input image set 664 in which the editing operation has been performed on the graphical feature. This data is provided to printing circuitry 690 for printing of output image 692.

The invention could also be applied in combination with other techniques, including those described in, coassigned U.S. patent application Ser. No. No. 08/158,132 now issued as U.S. Pat. No. 5,455,898, entitled "Analyzing an Image Showing a Graphical Representation of a Layout" and Ser. No. 08/158,063, now issued as U.S. Pat. No. 5,544,267, entitled "Using a Category to Analyze an Image Showing a Graphical Representation," both incorporated herein by reference.

E. Miscellaneous

The invention has been described in relation to implementations that analyze images showing human-produced editing marks. The invention might also be implemented to analyze other types of images, by using appropriate operations to use data defining an image showing editing marks to obtain data indicating operation category data.

The invention has been described in relation to applications in which operation category data are used to obtain data defining an output image. The invention might also be implemented to store operation category data or to use operation category data for other purposes, such as to provide control signals.

The invention has been described in relation to software implementations, but the invention might be implemented with specialized hardware.

The invention has been described in relation to implementations using serial processing techniques. The invention might also be implemented with parallel processing techniques.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A method comprising:

obtaining input image data defining an input image set that shows a first graphical feature and editing marks indicating an editing operation to be performed on the first graphical feature; the first graphical feature and the editing marks together forming a node-link structure that includes first and second nodes and a link extending between the first and second nodes; the first node including the first graphical feature; the second node including information about the editing operation; the first and second nodes satisfying a constraint on nodes; the link satisfying a constraint on links; and the node-link structure satisfying a constraint on node-link structures;

applying the constraint on nodes, the constraint on links, and the constraint on node-link structures to the input image data to obtain constrained node-link data indicating the first and second nodes and the link;

using the constrained node-link data to obtain link type data indicating whether a part of the input image set meets a link type criterion;

using the link type data to obtain operation category data; the operation category data indicating information about the editing operation; and using the operation category data to obtain output image data defining an output image; the output image including a version of the input image set in which the editing operation has been performed on the first graphical feature.

2. The method of claim 1 in which the input image set includes an original image and an overlay image; the overlay image showing the editing marks.

3. The method of claim 2 in which the original image shows the first graphical feature.

4. The method of claim 2 in which the overlay image shows the first graphical feature.

5. The method of claim 1 in which the link is a directed link; the editing operation being an operation that translates the first graphical feature so that it is centered at a different position within the input image set; the second node including position information about the different position; the act of using the constrained node-link data comprising:

using the position information from the second node to obtain position data indicating the different position.

6. The method of claim 1 in which the link is an undirected link; the editing operation being an operation that is performed without translating the first graphical feature so that it is centered at a different position within the input image set; the second node including type information indicating a type of editing operation that can be performed without translating the first graphical feature so that it is centered at a different position; the act of using the constrained node-link data comprising:

using the type information from the second node to obtain type data indicating the type of editing operation.

7. The method of claim 1 in which the editing operation includes a rotation of the first graphical feature; the second node including rotation information about the extent of the rotation; the act of using the constrained node-link data comprising:

using the rotation information from the second node to obtain rotation data indicating the extent of the rotation.

8. The method of claim 1 in which the editing operation includes a scaling of the first graphical feature; the second node including scaling information about the extent of the scaling; the act of using the constrained node-link data comprising:

using the scaling information from the second node to obtain scaling data indicating the extent of the scaling.

9. The method of claim 1 in which the link type criterion includes a shape criterion; the act of using the constrained node link data to obtain link type data comprising:

using the constrained node-link data to obtain shape data indicating whether the part of the input image set meets the shape criterion; and using the shape data to obtain the link type data.

10. The method of claim 9 in which the shape criterion includes a source end criterion and a destination end criterion; the act of using the constrained node-link data to obtain shape data includes obtaining directed link data indicating that the part of the input image set has a source end that meets the source end criterion and a destination end criterion that meets the destination criterion.

11. The method of claim 1 in which the operation category data indicates that the editing operation would translate the first graphical feature so that it is centered at a different position within the input image set if the part of the input image set meets the link type criterion.

12. A method comprising:

obtaining input image data defining an input image set that shows a first graphical feature and editing marks indicating an editing operation to be performed on the first graphical feature; the first graphical feature being centered at a position within the input image set;

using the input image data to obtain operation category data indicating whether the editing operation would translate the first graphical feature so that it is centered at a different position within the input image set; and using the operation category data to obtain output image data defining an output image; the output image including a version of the input image set in which the editing operation has been performed on the first graphical feature; the output image showing the first graphical feature centered at a different position only if the operation category data indicate that the editing operation would translate the first graphical feature so that it is centered at a different position within the input image set;

the act of using the input image data to obtain operation category data comprising:

using the input image data to obtain constrained node-link data indicating parts of the input image set that satisfy constraints on nodes, on links, and on node-link structures; the constrained node-link data indicating a first part of the input image set that satisfies a constraint on links; and using the constrained node-link data to obtain the operation category data;

the act of using the constrained node-link data comprising:

using the constrained node-link data to obtain link type data indicating whether the first part meets a link type criterion; and using the link type data to obtain the operation category data; the operation category data indicating that the editing operation would translate the first graphical feature so that it is centered at a different position within the input image set if the first part meets the link type criterion.

13. The method of claim 12 in which the link type criterion includes a shape criterion; the act of using the constrained node link data to obtain link type data comprising:

using the constrained node-link data to obtain shape data indicating whether the first part meets the shape criterion; and using the shape data to obtain the link type data.

14. The method of claim 13 in which the shape criterion includes a source end criterion and a destination end criterion; the act of using the constrained node-link data to obtain shape data comprising:

obtaining directed link data indicating that the first part has a source end that meets the source end criterion and a destination end that meets the destination end criterion;

the act of using the shape data to obtain the operation category data comprising:

obtaining operation category data indicating that the editing operation would translate the first graphical feature so that it is centered at a different position within the input image set.

15. The method of claim 14 in which the constrained node-link data further indicate a second part of the input image set that satisfies a constraint on nodes; the second part being near the destination end of the first part; the second part indicating a destination position at which the first graphical feature is to be centered after translation; the method further comprising:

using the constrained node-link data to obtain operation parameter data indicating a parameter of the editing operation; the act of using the constrained node-link data to obtain operation parameter data comprising:
using the constrained node-link data to obtain position data indicating the destination position.

16. The method of claim 15 in which the second part includes a destination node connected component that encloses a second graphical feature; the act of using the operation category data to obtain output image data comprising:
obtaining the output image data with the first graphical feature replacing the second graphical feature.

17. The method of claim 15 in which the first graphical feature includes a set of two or more connected components near the source end of the first part; the constrained node-link data further indicating a third part of the input image set that satisfies a constraint on nodes; the third part including a source node connected component that encloses the set of connected components.

18. The method of claim 15 in which the second part includes a scale feature that has a dimension that indicates a parameter of scaling; the act of using the constrained node-link data to obtain operation parameter data further comprising:
using the constrained node-link data to obtain scale data indicating the parameter of scaling;
the act of using the operation category data to obtain output image data comprising:
using the scale data to obtain the output image data; the output image showing the first graphical feature scaled in accordance with the parameter of scaling.

19. The method of claim 18 in which the scale feature is a rectangle.

20. The method of claim 18 in which the second part further includes a rotation feature that has a position that indicates a parameter of rotation; the act of using the constrained node-link data to obtain operation parameter data further comprising:
using the constrained node-link data to obtain rotation data indicating the parameter of rotation;
the act of using the operation category data to obtain output image data comprising:
using the rotation data to obtain the output image data; the output image showing the first graphical feature rotated in accordance with the parameter of rotation.

21. The method of claim 20 in which the rotation feature is a dot within the scale feature, the position of the dot within the scale feature indicating the parameter of rotation.

22. The method of claim 13 in which the act of using the constrained node-link data to obtain shape data comprises:
obtaining undirected link data indicating that the first part does not meet the shape criterion;
the act of using the shape data to obtain the operation category data comprising:
obtaining operating category data indicating that the editing operation would not translate the first graphical feature so that it is centered at a different position within the input image set.

23. The method of claim 22 in which the first part has first and second opposite ends; the constrained node-link data further indicating a second part of the input image set that satisfies a constraint on nodes; the second part being near the first end of the first part; the first graphical feature being near the second end of the first part; the second part including a delete feature indicating that the editing operation is a delete operation; the act of using the operation category data to obtain the output image data further comprising:
obtaining the output image data by deleting the first graphical feature from the input image set so that the output image includes a version of the input image set that does not show the first graphical feature.

24. The method of claim 23 in which the delete feature is a cross.

25. The method of claim 22 in which the first part has first and second opposite ends; the constrained node-link data further indicating a second part of the input image set that satisfies a constraint on nodes; the second part being near the first end of the first part; the second part including a scale feature indicating that the editing operation includes a scaling operation; the first graphical feature being near the second end of the first part; the scale feature having a dimension that indicates a parameter of scaling; the method further comprising:
using the constrained node-link data to obtain operation parameter data indicating a parameter of the editing operation; the act of using the constrained node-link data to obtain operation parameter data comprising:
using the constrained node-link to obtain scale data indicating the parameter of scaling;
the act of using the operation category data to obtain output image data comprising:
using the scale data to obtain the output image data; the output image showing the first graphical feature scaled in accordance with the parameter of scaling.

26. The method of claim 25 in which the scale feature is a rectangle.

27. The method of claim 25 in which the scale feature further includes a rotation feature that has a position that indicates a parameter of rotation; the act of using the constrained node-link data to obtain operation parameter data further comprising:
using the constrained node-link data to obtain rotation data indicating the parameter of rotation;
the act of using the operation category data to obtain output image data comprising:
using the rotation data to obtain the output image data; the output image showing the first graphical feature rotated in accordance with the parameter of rotation.

28. The method of claim 27 in which the rotation feature is a dot inside the scale feature, the position of the dot within the scale feature indicating the parameter of rotation.

29. A method of operating a machine that includes:
image input circuitry for obtaining data defining images as input; and
a processor connected for receiving data defining images from the image input circuitry;
the method comprising:
operating the processor to receive input image data from the image input circuitry, the input image data defining an input image set that shows a first graphical feature and editing marks indicating an editing operation to be performed on the first graphical feature; the first graphical feature and the editing marks together forming a node-link structure that includes first and second nodes and a link extending between the first and second nodes; the first node including the first graphical feature; the second node including information about the editing operation; the first and second nodes satisfying a constraint on nodes; the link satisfying a constraint on links; and the node-link structure satisfying a constraint on node-link structures;

operating the processor to apply the constraint on nodes, the constraint on links, and the constraint on node-link structures to the input image data to obtain constrained node-link data indicating the first and second nodes and the link;

operating the processor to use the constrained node-link data to obtain link type data indicating whether a part of the input image set meets a link type criterion;

operating the processor to use the link type data to obtain operation category data; the operation category data indicating information about the editing operation; and operating the processor to use the operation category data to obtain output image data defining an output image; the output image including a version of the input image set in which the editing operation has been performed on the first graphical feature.

30. The method of claim 29 in which the first graphical feature is in a graphical representation; the graphical representation being in a category of graphical representations; the editing operation being of a first type of editing operation; the machine further including memory storing additional operation data indicating an additional operation that is required to complete an editing operation of the first type performed on a graphical feature in the category of graphical representations; the act of using the operation category data to obtain output image data comprising:

using the input image data to obtain representation category data indicating the category of graphical representations and operation type data indicting that the editing operation is of the first type;

using the representation category data and the operation type data to access the additional operation data; and using the additional operation data to obtain the output image data so that the output image shows a version of the graphical representation in which the additional operation has been performed.

31. The method of claim 30 in which the editing operation is a delete operation; the first graphical feature being in a directed graph that includes a second graphical feature related to the first graphical feature; the additional operation deleting the second graphical feature.

32. The method of claim 29 in which the machine further comprises image output circuitry for providing data defining images as output; the method further comprising:

providing the output image data to the image output circuitry.

33. A machine comprising:

image input circuitry for obtaining data defining images as input;

memory for storing data; and a processor connected for receiving data defining images from the image input circuitry and connected for accessing data stored in the memory;

the data stored in the memory comprising instruction data indicating image processing instructions the processor can execute; the processor, in executing the image processing instructions:

receiving input image data from the image input circuitry, the input image data defining an input image set that shows a first graphical feature and editing marks indicating an editing operation to be performed on the first graphical feature; the first graphical feature and the editing marks together forming a node-link structure that includes first and second nodes and a link extending between the first and second nodes; the first node including the first graphical feature; the second node including information about the editing operation; the first and second nodes satisfying a constraint on nodes; the link satisfying a constraint on links; and the node-link structure satisfying a constraint on node-link structures;

applying the constraint on nodes, the constraint on links, and the constraint on node-link structures to the input image data to obtain constrained node-link data indicating the first and second nodes and the link;

using the constrained node-link data to obtain link type data indicating whether a part of the input image set meets a link type criterion;

using the link type data to obtain operation category data; the operation category data indicating information about the editing operation; and using the operation category data to obtain output image data defining an output image; the output image including a version of the input image set in which the editing operation has been performed on the first graphical feature.

34. The machine of claim 33 in which the input image circuitry is connected for receiving facsimile transmissions.

35. The machine of claim 33 in which the machine further comprises image output circuitry for providing data defining images as output; the processor further, in executing the image processing instructions:

providing the output image data to the image output circuitry.

36. The machine of claim 35 in which the output image circuitry is connected for providing facsimile transmissions.

37. The machine of claim 33 in which the machine is an image processing server; the image processing server being connected to a network for receiving requests for image processing operations; the network including the image input circuitry; the instruction data further indicating request handling instructions the processor can execute; the processor, in executing the request handling instructions, determining whether to execute the image processing instructions.

38. The machine of claim 33 in which the machine is a fax server.

39. The machine of claim 33 in which the machine is a copier.

40. An article of manufacture for use in a machine that includes:

image input circuitry for obtaining data defining images as input;

a storage medium access device for accessing a medium that stores data; and a processor connected for receiving data defining images from the image input circuitry; the processor further being connected for receiving data from the storage medium access device;

the article comprising:

a storage medium that can be accessed by the storage medium access device when the article is used in the machine; and data stored by the storage medium so that the storage medium access device can provide the stored data to the processor when the article is used in the machine; the stored data comprising instruction data indicating instructions the processor can execute; the processor, in executing the instructions:

receiving input image data from the image input circuitry, the input image data defining an input image set that shows a first graphical feature and editing marks indicating an editing operation to be performed on the first graphical feature; the first graphical feature and the editing marks together forming a node-link structure that includes first and second nodes and a link extending between the first and second nodes; the first node including the first graphical feature; the second node including information about the editing operation; the first and second nodes satisfying a constraint on nodes; the link satisfying a constraint on links; and the node-link structure satisfying a constraint on node-link structures;

applying the constraint on nodes, the constraint on links, and the constraint on node-link structures to the input image data to obtain constrained node-link data indicating the first and second nodes and the link;

using the constrained node-link data to obtain link type data indicating whether a part of the input image set meets a link type criterion;

using the link type data to obtain operation category data; the operation category data indicating information about the editing operation; and using the operation category data to obtain image output image data defining an output image; the output image including a version of the input image set in which the editing operation has been performed on the first graphical feature.

* * * * *